United States Patent
Boyd et al.

(10) Patent No.: US 11,411,900 B2
(45) Date of Patent: Aug. 9, 2022

(54) OFF-PLATFORM MESSAGING SYSTEM

(71) Applicant: Snap Inc., Santa Monica, CA (US)

(72) Inventors: Nathan Kenneth Boyd, Los Angeles, CA (US); Benedict Copping, Los Angeles, CA (US); Christie Marie Heikkinen, Santa Monica, CA (US); Celia Nicole Mourkogiannis, Los Angeles, CA (US); David Taitz, Santa Monica, CA (US); Mai Chi Tran, Garden Grove, CA (US)

(73) Assignee: Snap Inc., Santa Monica, CA (US)

( * ) Notice: Subject to any disclaimer, the term of this patent is extended or adjusted under 35 U.S.C. 154(b) by 113 days.

(21) Appl. No.: 16/835,080

(22) Filed: Mar. 30, 2020

(65) Prior Publication Data

US 2021/0306288 A1    Sep. 30, 2021

(51) Int. Cl.
*H04L 51/046* (2022.01)
*H04L 51/224* (2022.01)
(Continued)

(52) U.S. Cl.
CPC ............ *H04L 51/046* (2013.01); *G06F 9/542* (2013.01); *H04L 12/1813* (2013.01);
(Continued)

(58) Field of Classification Search
CPC .... H04L 51/046; H04L 51/24; H04L 12/1813
See application file for complete search history.

(56) References Cited

U.S. PATENT DOCUMENTS

| | | |
|---|---|---|
| 6,681,393 B1 | 1/2004 | Bauminger et al. |
| 6,732,103 B1 | 5/2004 | Strick et al. |

(Continued)

FOREIGN PATENT DOCUMENTS

| | | |
|---|---|---|
| CN | 1653829 A | 8/2005 |
| CN | 1791070 A | 6/2006 |

(Continued)

OTHER PUBLICATIONS

U.S. Appl. No. 16/503,783, filed Jul. 5, 2019, Event Planning in a Content Sharing Platform.

(Continued)

*Primary Examiner* — Douglas B Blair
(74) *Attorney, Agent, or Firm* — Schwegman Lundberg & Woessner, P.A.

(57) ABSTRACT

A method, to manage an event invitation in a computer network environment, comprises presenting, using one or more processors, an event invitation creation indicium to a first user on a user interface of a computing device. Responsive to user selection of the event invitation creation indicium, an event creation interface is presented to receive event details. Responsive to receipt of the event details, an event invitation message is generated for communication, via a messaging system, by the first user to a second user of the messaging system, the event invitation message including a join indicium that is user-selectable to join a group chat related to the event. Responsive to a message send input from the first user, the event invitation message is sent, via the messaging system, from the first user to the second user. A request is received, from the second user, a request to join the group chat related to the event. A group chat message thread, associated with an event group including at least the first user and the second user, is then stored within the messaging system.

20 Claims, 27 Drawing Sheets

(51) Int. Cl.
*H04W 8/26* (2009.01)
*H04W 4/14* (2009.01)
*G06F 9/54* (2006.01)
*H04L 12/18* (2006.01)

(52) U.S. Cl.
CPC ............ *H04L 51/224* (2022.05); *H04W 4/14* (2013.01); *H04W 8/26* (2013.01)

(56) References Cited

U.S. PATENT DOCUMENTS

| | | | |
|---|---|---|---|
| 7,397,806 | B2 | 7/2008 | Burger |
| 7,818,415 | B2 | 10/2010 | Jhanji |
| 8,065,171 | B2 | 11/2011 | Nguyen et al. |
| RE45,040 | E | 7/2014 | Fish et al. |
| 8,933,967 | B2 | 1/2015 | Huston et al. |
| 9,118,723 | B1* | 8/2015 | Su .................... H04L 67/22 |
| 9,245,025 | B2 | 1/2016 | Chen |
| 9,356,904 | B1 | 5/2016 | Ho |
| 9,495,086 | B2 | 11/2016 | May et al. |
| 9,544,257 | B2 | 1/2017 | Ogundokun et al. |
| 9,817,995 | B2 | 11/2017 | Papakipos et al. |
| 9,992,146 | B2 | 6/2018 | Fabre et al. |
| 10,049,330 | B2 | 8/2018 | Alag et al. |
| 10,395,257 | B2* | 8/2019 | Patterson .............. G06Q 30/02 |
| 10,791,077 | B2 | 9/2020 | Andreou et al. |
| 11,134,036 | B2 | 9/2021 | Taitz et al. |
| 2002/0070954 | A1 | 6/2002 | Lang |
| 2004/0162881 | A1 | 8/2004 | Digate et al. |
| 2005/0267975 | A1 | 12/2005 | Qureshi et al. |
| 2007/0198316 | A1 | 8/2007 | Boland et al. |
| 2007/0242131 | A1 | 10/2007 | Sanz-pastor et al. |
| 2007/0250366 | A1 | 10/2007 | Nurmi |
| 2008/0076453 | A1 | 3/2008 | Cai et al. |
| 2008/0098079 | A1 | 4/2008 | Sanghavi |
| 2008/0162615 | A1 | 7/2008 | Hurmola et al. |
| 2009/0132665 | A1* | 5/2009 | Thomsen .............. H04L 67/04 709/206 |
| 2009/0228322 | A1 | 9/2009 | Van et al. |
| 2010/0069104 | A1 | 3/2010 | Neil et al. |
| 2010/0131598 | A1 | 5/2010 | Ruelas-arana |
| 2011/0035678 | A1 | 2/2011 | Hamrick et al. |
| 2011/0126253 | A1 | 5/2011 | Roberts et al. |
| 2011/0244894 | A1* | 10/2011 | Mahalingam .......... H04W 4/20 455/466 |
| 2011/0312307 | A1 | 12/2011 | Gross et al. |
| 2012/0102123 | A1 | 4/2012 | Tysk |
| 2012/0246679 | A1 | 9/2012 | Chen |
| 2012/0290666 | A1 | 11/2012 | Fabre et al. |
| 2012/0331568 | A1 | 12/2012 | Weinstein et al. |
| 2013/0066963 | A1 | 3/2013 | Odio et al. |
| 2013/0144674 | A1 | 6/2013 | Kim et al. |
| 2013/0198013 | A1 | 8/2013 | Shehan et al. |
| 2013/0212494 | A1 | 8/2013 | Heiferman et al. |
| 2013/0329060 | A1 | 12/2013 | Yim |
| 2013/0332856 | A1 | 12/2013 | Sanders et al. |
| 2014/0032682 | A1 | 1/2014 | Prado et al. |
| 2014/0143434 | A1* | 5/2014 | Sanche ............... H04L 65/4015 709/228 |
| 2014/0172856 | A1* | 6/2014 | Imbruce ............... G06F 16/489 707/737 |
| 2014/0280566 | A1 | 9/2014 | Chen et al. |
| 2014/0379798 | A1 | 12/2014 | Bunner et al. |
| 2015/0066614 | A1* | 3/2015 | Gilmartin ............ G06Q 50/01 705/14.14 |
| 2015/0170045 | A1 | 6/2015 | Kirkham et al. |
| 2015/0222580 | A1 | 8/2015 | Grue |
| 2015/0269531 | A1* | 9/2015 | Menayas ............ G06Q 10/1093 705/7.18 |
| 2015/0271126 | A1* | 9/2015 | Menayas ............... H04W 4/02 709/206 |
| 2015/0271638 | A1* | 9/2015 | Menayas ............... H04W 4/21 455/456.3 |
| 2015/0324826 | A1 | 11/2015 | Mizushima |
| 2016/0014059 | A1 | 1/2016 | Rathod |
| 2016/0057156 | A1 | 2/2016 | Lin et al. |
| 2016/0094961 | A1 | 3/2016 | Agrawal et al. |
| 2016/0191653 | A1 | 6/2016 | Aluotto |
| 2016/0196239 | A1 | 7/2016 | Liu et al. |
| 2016/0253833 | A1 | 9/2016 | Lew |
| 2016/0261527 | A1 | 9/2016 | Huang |
| 2016/0269675 | A1 | 9/2016 | Tsujimoto |
| 2017/0024091 | A1 | 1/2017 | Hosier, Jr. |
| 2017/0104712 | A1 | 4/2017 | Cho et al. |
| 2017/0124606 | A1* | 5/2017 | Belle .................. G06Q 30/0255 |
| 2017/0149699 | A1 | 5/2017 | Hinson, Jr. |
| 2017/0161382 | A1 | 6/2017 | Ouimet et al. |
| 2017/0161599 | A1 | 6/2017 | Li et al. |
| 2017/0177607 | A1 | 6/2017 | Fahey |
| 2017/0221095 | A1 | 8/2017 | Gauglitz et al. |
| 2017/0279751 | A1 | 9/2017 | Quirarte et al. |
| 2017/0357950 | A1 | 12/2017 | Bennett et al. |
| 2018/0013861 | A1 | 1/2018 | Howard et al. |
| 2018/0054487 | A1 | 2/2018 | Hebsur et al. |
| 2018/0191831 | A1 | 7/2018 | Wadley et al. |
| 2018/0227376 | A1* | 8/2018 | Schneider ............. H04L 67/22 |
| 2018/0246623 | A1* | 8/2018 | Peled .................... G06Q 20/10 |
| 2018/0246983 | A1* | 8/2018 | Rathod ............... G06F 16/9535 |
| 2018/0329622 | A1* | 11/2018 | Missig ................ G06F 3/0219 |
| 2018/0332446 | A1 | 11/2018 | Seidman |
| 2018/0336644 | A1* | 11/2018 | Albertine ............. H04L 67/306 |
| 2018/0350144 | A1* | 12/2018 | Rathod ................. A63F 13/216 |
| 2018/0351888 | A1 | 12/2018 | Howard |
| 2018/0351895 | A1* | 12/2018 | Rathod .................... G06F 9/54 |
| 2018/0357609 | A1 | 12/2018 | Hwacinski et al. |
| 2019/0052587 | A1 | 2/2019 | Andreou et al. |
| 2019/0188752 | A1* | 6/2019 | Jones ................. G06Q 30/0258 |
| 2019/0205841 | A1 | 7/2019 | Burlin et al. |
| 2019/0333023 | A1 | 10/2019 | Foran |
| 2019/0356620 | A1* | 11/2019 | Presley .................. H04L 51/10 |
| 2019/0392399 | A1 | 12/2019 | Horne |
| 2020/0112450 | A1 | 4/2020 | Chhabra et al. |
| 2020/0184478 | A1* | 6/2020 | Peled ...................... G07G 1/01 |
| 2020/0193390 | A1 | 6/2020 | Almanza Ahumada et al. |
| 2020/0358728 | A1 | 11/2020 | Andreou et al. |
| 2020/0410453 | A1 | 12/2020 | Nalliah et al. |
| 2021/0006519 | A1 | 1/2021 | Taitz et al. |
| 2021/0226904 | A1 | 7/2021 | Taitz et al. |

FOREIGN PATENT DOCUMENTS

| | | |
|---|---|---|
| CN | 103457994 A | 12/2013 |
| CN | 103702297 A | 4/2014 |
| CN | 104954402 A | 9/2015 |
| CN | 106789547 A | 5/2017 |
| CN | 106992921 A | 7/2017 |
| CN | 111133723 A | 5/2020 |
| DE | 202016008173 U1 | 6/2017 |
| KR | 102343824 B1 | 12/2021 |
| WO | WO-2019032703 A1 | 2/2019 |

OTHER PUBLICATIONS

U.S. Appl. No. 17/222,247, filed Apr. 5, 2021, Event Planning in a Content Sharing Platform.

"U.S. Appl. No. 16/503,783, Non Final Office Action dated Oct. 16, 2020", 16 pgs.

"U.S. Appl. No. 16/503,783, Response filed Dec. 21, 2020 to Non Final Office Action dated Oct. 16, 2020", 12 pgs.

"U.S. Appl. No. 16/503,783, Notice of Allowance dated Jan. 11, 2021", 11 pgs.

"Surprise!", [Online]. Retrieved from the Internet: <https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online], Retrieved from the Internet: <https://techcrunch.com/2013/10/03/snapchat-gets-its-own-timeline-with-snapchat-stories-24-hour-photo-video-tales/>, (Oct. 3, 2013), 2 pgs.

(56) References Cited

OTHER PUBLICATIONS

Hamburger, Ellis, "Snapchat's next big thing: 'Stories' that don't just disappear", [Online], Retrieved from the Internet: <https://www.theverge.com/2013/10/3/4791934/snapchats-next-big-thing-stories-that-dont-just-disappear, (Oct. 3, 2013), 5 pgs.
"U.S. Appl. No. 16/503,783, Corrected Notice of Allowability dated Sep. 2, 2021", 2 pgs.
"U.S. Appl. No. 16/503,783, Notice of Allowance dated May 27, 2021", 5 pgs.
"U.S. Appl. No. 17/222,247, Non Final Office Action dated Jan. 5, 2022", 9 pgs.
"U.S. Appl. No. 15/859,237, Final Office Action dated Sep. 6, 2019", 12 pgs.
"U.S. Appl. No. 15/859,237, Non Final Office Action dated Mar. 28, 2019", 11 pgs.
"U.S. Appl. No. 15/859,237, Notice of Allowability dated Sep. 2, 2020", 2 pgs.
"U.S. Appl. No. 15/859,237, Notice of Allowance dated Apr. 22, 2020", 5 pgs.
"U.S. Appl. No. 15/859,237, Response filed Feb. 3, 2020 to Final Office Action dated Sep. 6, 2019", 9 pgs.
"U.S. Appl. No. 15/859,237, Response filed Aug. 28, 2019 to Non Final Office Action dated Mar. 28, 2019", 9 pgs.
"U.S. Appl. No. 15/859,237, Supplemental Notice of Allowability dated May 14, 2020", 2 pgs.
"U.S. Appl. No. 16/942,061, Non Final Office Action dated May 26, 2022", 16 pgs.
"U.S. Appl. No. 16/942,061, Preliminary Amendment filed Aug. 31, 2020", 7 pgs.
"U.S. Appl. No. 17/222,247, Notice of Allowance dated Apr. 12, 2022", 11 pgs.
"U.S. Appl. No. 17/222,247, Response filed Mar. 22, 2022 to Non Final Office Action dated Jan. 5, 2022", 7 pgs.
"Chinese Application Serial No. 201880057966.5, Response filed May 7, 2022 to Office Action dated Feb. 22, 2022", w/ English Claims, 9 pgs.
"Chinese Application Serial No. 201880057966.5, Office Action dated Feb. 22, 2022", w/ English translation, 12 pgs.
"Chinese Application Serial No. 201880057966.5, Office Action dated Jun. 28, 2021", w/ English Translation, 14 pgs.
"Chinese Application Serial No. 201880057966.5, Response filed Nov. 12, 2021 to Office Action dated Jun. 28, 2021", w/ English Claims, 13 pgs.
"European Application Serial No. 18842992.2, Communication Pursuant to Article 94(3) EPC dated Aug. 4, 2021", 10 pgs.
"European Application Serial No. 18842992.2, Extended European Search Report dated Jul. 20, 2020", 10 pgs.
"International Application Serial No. PCT/US2018/045815, International Preliminary Report on Patentability dated Feb. 20, 2020", 9 pgs.
"International Application Serial No. PCT/US2018/045815, International Search Report dated Nov. 28, 2018", 3 pgs.
"International Application Serial No. PCT/US2018/045815, Written Opinion dated Nov. 28, 2018", 7 pgs.
"Korean Application Serial No. 10-2020-7006769, Notice of Preliminary Rejection dated Apr. 2, 2021", w/ English Translation, 10 pgs.
"Korean Application Serial No. 10-2020-7006769, Response filed Jul. 8, 2021 to Notice of Preliminary Rejection dated Apr. 2, 2021", w/ English Claims, 18 pgs.

\* cited by examiner

USER INTERFACE

OFF-PLATFORM MESSAGING SYSTEM

BACKGROUND

Current solutions to the organization of group events suffer from a number of shortcomings, particularly with respect to negative inferences that a group of invited attendees may make with respect to the lack of response by other invitees and also the commitment required, sometimes on short notice, about whether to attend an event or not. Furthermore, communications related to an event are not easily facilitated. Solutions to these issues present a number of technical challenges that are not easily addressed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
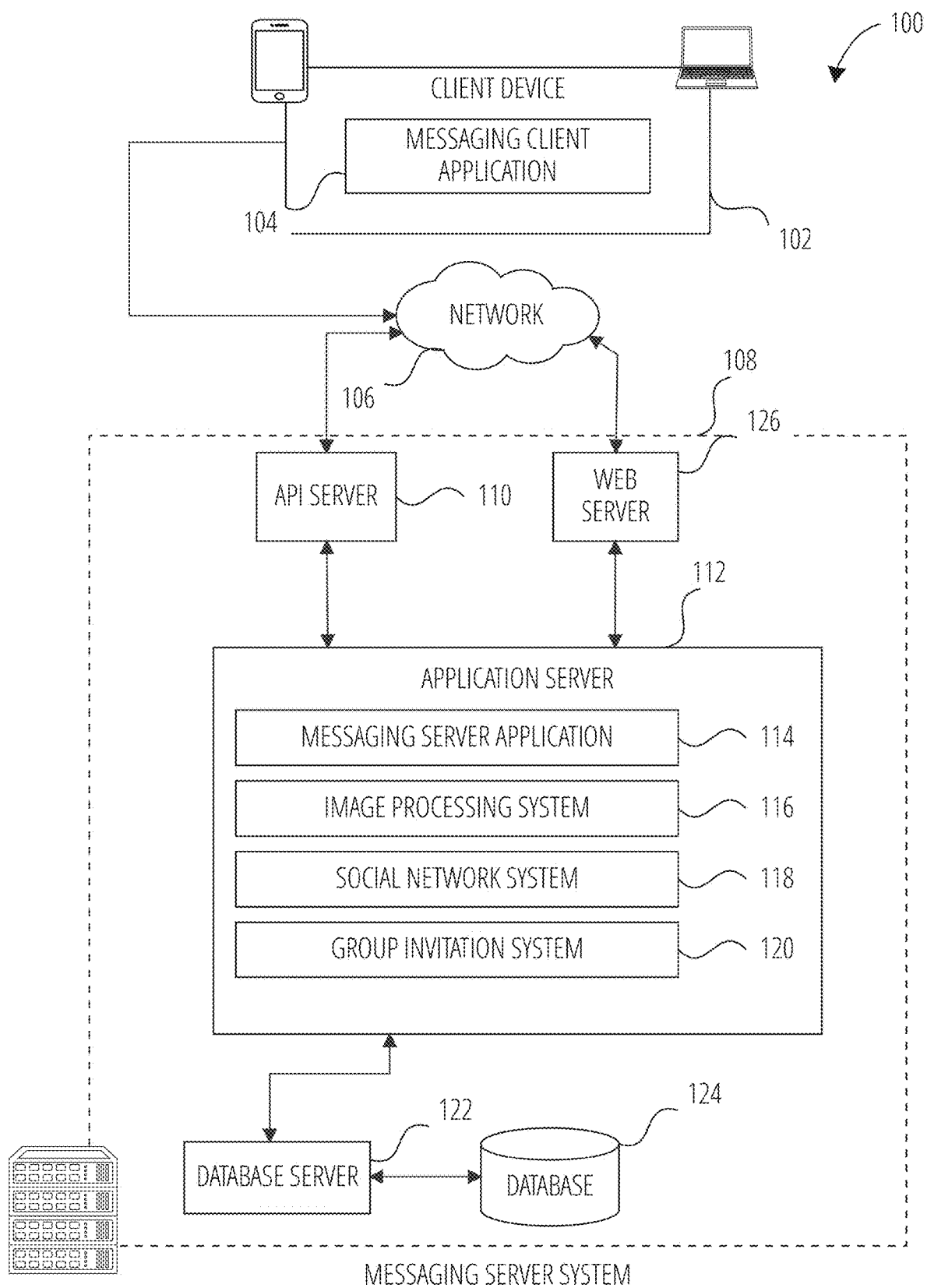
FIG. 1 is a diagrammatic representation of a networked environment in which the present disclosure may be deployed, in accordance with some examples.

Planning for an event using current digital solutions presents a number of logistical and technical challenges. Such solutions, such as Eventbrite, Meetup and Facebook events are typically geared towards larger public or professional events, and may be intimidating for users seeking to plan medium-size parties and events, or even more intimate smaller events. Example problems that are not addressed by current solutions include logistics for getting the correct group of people together. For example, social anxiety comes along with choosing new combinations of people for a new group, while using an existing group may unnecessarily limit attendees.

Further, when organizing events, important details (e.g., location) and information are not surfaced, and users may not be appropriately updated regarding changes.

There is also social anxiety and a "groupthink" aspect to responding to event invitations—e.g.; no one responds because no one else has yet responded.

According to some examples, there is provided a messaging system that supports opt-in messaging groups, with the messaging groups having event-specific features provided by a group invitation system that forms part of the messaging system. The event-specific features supported by the group invitation system may include convenient event invitation creation, the sharing of such event invitations within the context of the messaging system, but also externally to persons who may not be currently registered users of the messaging system, and the user-friendly presentation of details of an event to a user with a convenient mechanism for joining an opt-in group chat pertaining to the event.

The example group invitation system seeks to bring the "right" people together for an event, by enabling them to invite their friends to an opt-in group, thus allowing the invitation to be communicated to people across different social circles. Further, by presenting the invitations as an invitation to join a group chat related to an event (as opposed to an invitation to the event directly), the group invitation system supports a convenient way to involve people in a discussion regarding an event without requiring the immediate commitment of attending the event. By facilitating social engagement within the context of a group chat relating to an event, users can decide about whether to attend the event in a less pressured and more natural manner.

The example group invitation system also enables the simple and casual creation of invitations that can be as simple or as detailed as a creator requires and also enables a user to share an invitation in a one-to-one chat, or a one-to-many message. Further, by enabling an inviting user to personalize an invitation using creative tools (e.g., provided by the annotation system 306 described herein), an invited user is encouraged to respond.

The format of certain invitations supported by the example group invitation system may furthermore selectively display a number of persons that have joined a group chat pertaining to the event, while not displaying a number of persons that have been invited to the group chat. In this way, an invited user is not influenced in his or her decision to respond by a perceived degree of response by other users.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 122, which facilitates access to a database 124 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

A web server 126 receives and transmits interface and message data between the client device 102 and the application server 112. The web server 126 operates to generate and communicate the web pages, as examples of interfaces, described herein.

The application server 112 hosts a number of applications and subsystems, including a messaging server application 114, an image processing system 116, a social network system 118 and a group invitation system 120. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Some processor and memory intensive processing of data may also be performed server-side by the messaging server application 114, in view of the hardware requirements for such processing.

The image processing system 116 performs various image processing operations, typically with respect to images or video received within the payload of a message at the messaging server application 114.

Figure 4:
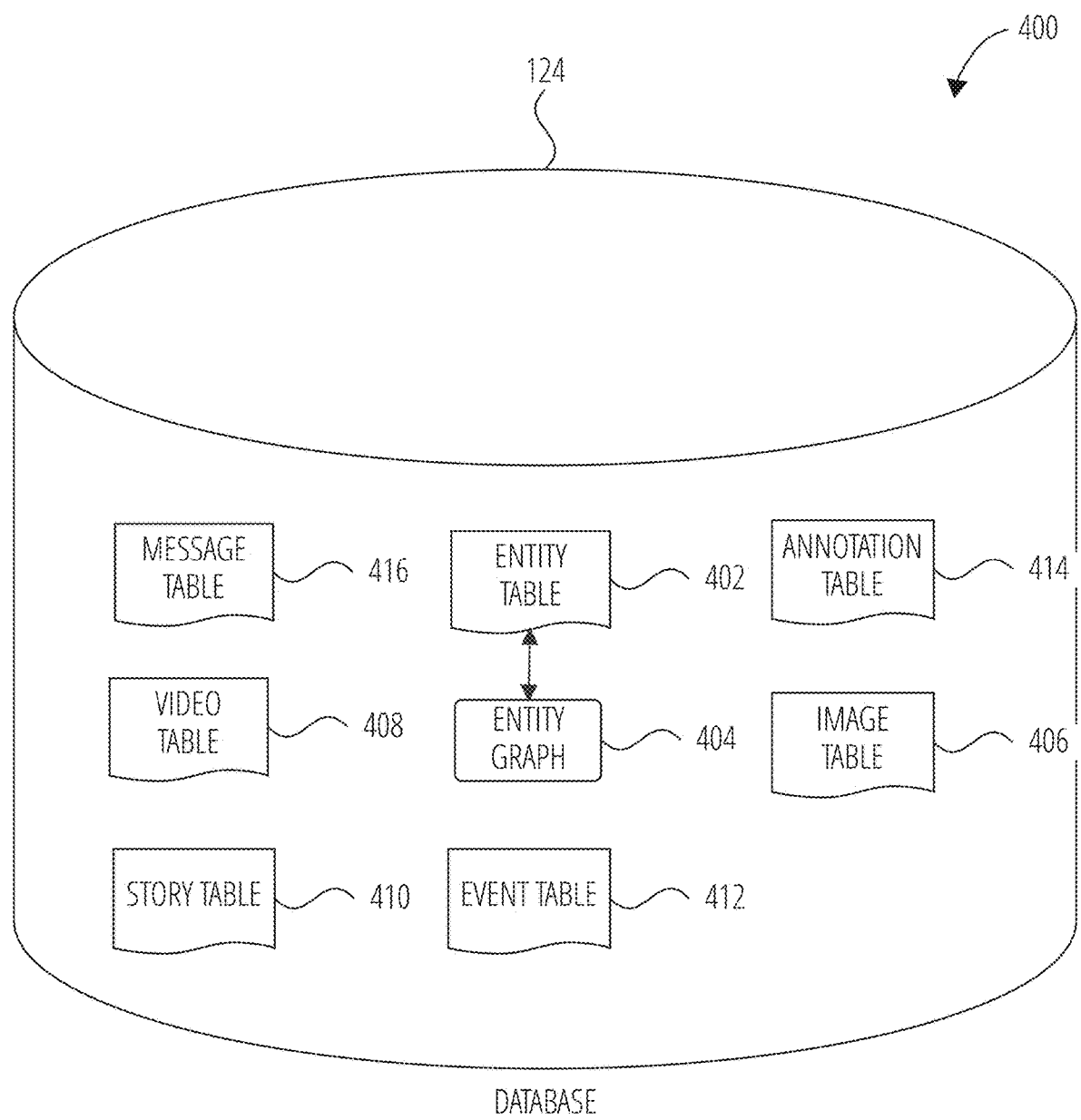
FIG. 4 is a diagrammatic representation of a data structure as maintained in a database, in accordance with some examples.

The social network system 118 supports various social networking functions services, and makes these functions and services available to the messaging server application 114. To this end, the social network system 118 maintains and accesses an entity graph 404 (as shown in FIG. 4) within the database 124. Examples of functions and services supported by the social network system 118 include the identification of other users of the messaging system 100 with which a particular user has relationships or is "following", and also the identification of other entities and interests of a particular user.

The group invitation system 120 is tightly integrated with the messaging server application 114, and facilitates the creation distribution and processing of responses to invitations to group chats pertaining to events. Further details and examples of various functions supported by the group invitation system 120 are discussed below.

The application server 112 is communicatively coupled to a database server 122, which facilitates access to a database 124 in which is stored data associated with messages processed by the messaging server application 114.

Figure 2:
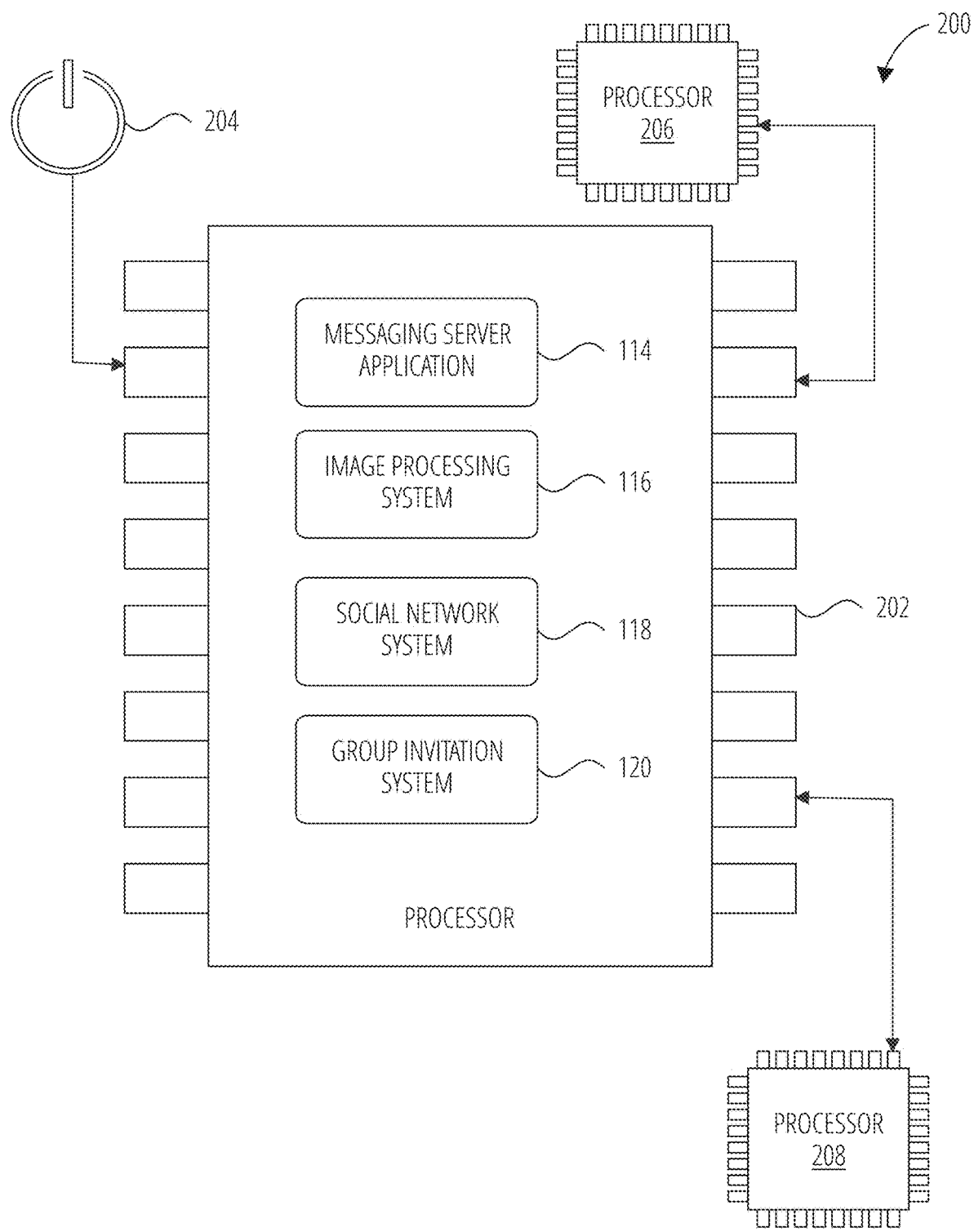
FIG. 2 is a diagrammatic representation of a processing environment, in accordance with some examples.

Turning now to FIG. 2, there is shown a diagrammatic representation of a processing environment 200, which includes a collection of processors including for example processor 202, processor 206 and processor 206 (e.g., a GPU, CPU or combination thereof).

The processor 202 is shown to be coupled to a power source 204, and to include (either permanently configured or temporarily instantiated) modules, namely a messaging server application 114, an image processing system 116, a social network system 118 and a screenshot group invitation system 120. As illustrated, the processor 202 is communicatively coupled to both the processor 206 and processor 208, and receives data from the processor 206 and the processor 208.

Figure 3:
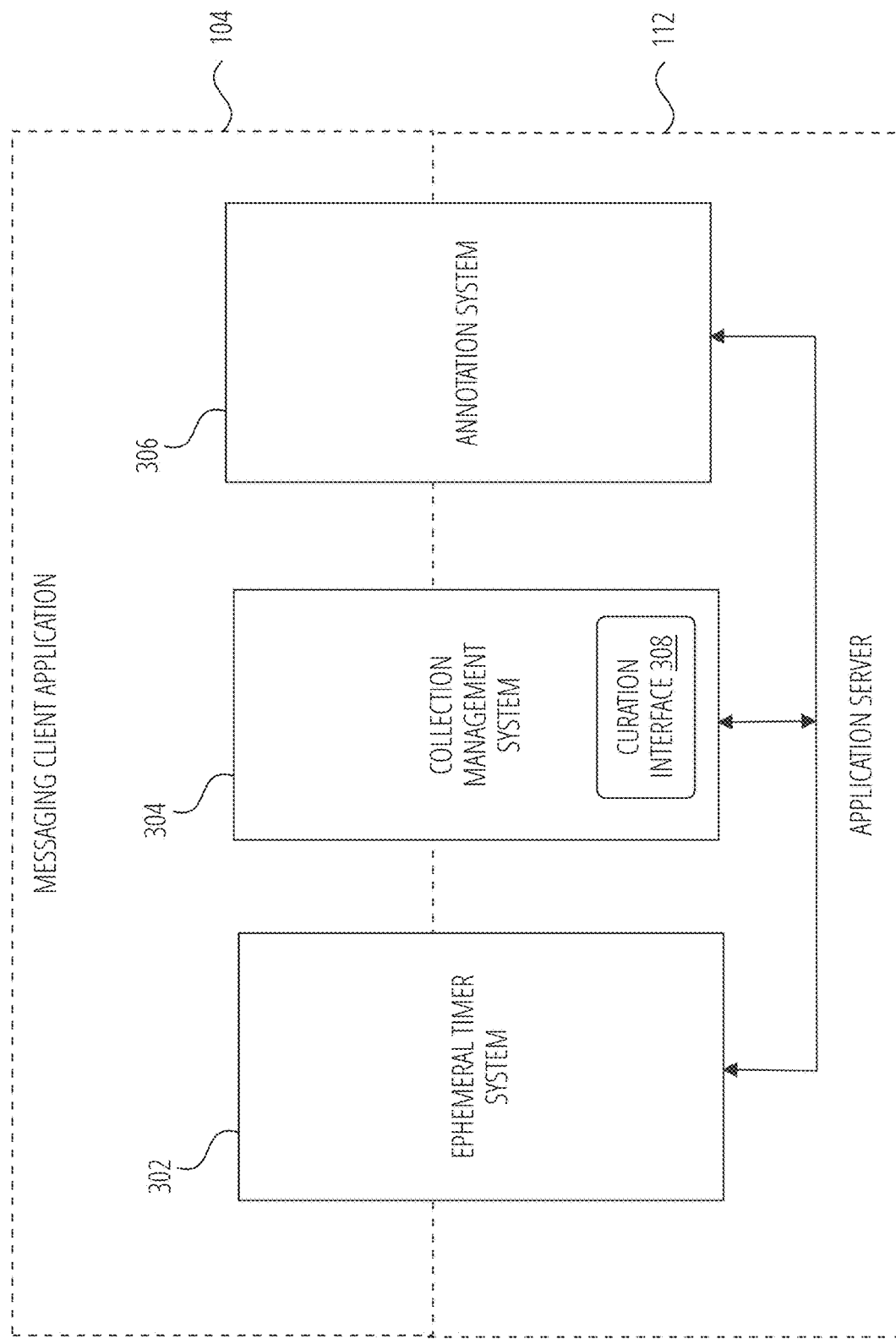
FIG. 3 is a diagrammatic representation of a messaging client application, in accordance with some examples.

FIG. 3 is a block diagram illustrating further details regarding the messaging system 100, according to examples. Specifically, the messaging system 100 is shown to comprise the messaging client application 104 and the application server 112, which in turn embodies a number of some subsystems, namely an ephemeral timer system 302, a collection management system 304 and an annotation system 306.

The ephemeral timer system 302 is responsible for enforcing the temporary access to content permitted by the messaging client application 104 and the messaging server application 114. To this end, the ephemeral timer system 302 incorporates a number of timers that, based on duration and display parameters associated with a message, or collection of messages (e.g., a story), selectively display and enable access to messages and associated content via the messaging client application 104. Further details regarding the operation of the ephemeral timer system 302 are provided below.

The collection management system 304 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 304 may also be responsible for publishing an icon that provides notification of the existence of a particular collection to the user interface of the messaging client application 104.

The collection management system 304 furthermore includes a curation interface 308 that allows a collection manager to manage and curate a particular collection of content. For example, the curation interface 308 enables an event organizer to curate a collection of content relating to a specific event (e.g., delete inappropriate content or redundant messages). Additionally, the collection management system 304 employs machine vision (or image recognition technology) and content rules to automatically curate a content collection. In certain embodiments, compensation may be paid to a user for inclusion of user-generated content into a collection. In such cases, the curation interface 308 operates to automatically make payments to such users for the use of their content.

The annotation system 306 provides various functions that enable a user to annotate or otherwise modify or edit media content associated with a message. For example, the annotation system 306 provides functions related to the generation and publishing of media overlays for messages processed by the messaging system 100. The annotation system 306 operatively supplies a media overlay or supplementation (e.g., an image filter) to the messaging client application 104 based on a geolocation of the client device 102. In another example, the annotation system 306 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 306 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In one example embodiment, the annotation system 306 provides a user-based publication platform that enables users to select a geolocation on a map, and upload content associated with the selected geolocation. The user may also specify circumstances under which a particular media overlay should be offered to other users. The annotation system 306 generates a media overlay that includes the uploaded content and associates the uploaded content with the selected geolocation.

In another example embodiment, the annotation system 306 provides a merchant-based publication platform that enables merchants to select a particular media overlay associated with a geolocation via a bidding process. For example, the annotation system 306 associates the media overlay of a highest bidding merchant with a corresponding geolocation for a predefined amount of time.

FIG. 4 is a schematic diagram illustrating data structures 400 which may be stored in the database 124 of the messaging server system 108, according to certain examples. While the content of the database 124 is shown to comprise a number of tables, it will be appreciated that the data could be stored in other types of data structures (e.g., as an object-oriented database).

The database 124 includes message data stored within a message table 416. The entity table 402 stores entity data, including an entity graph 404. Entities for which records are maintained within the entity table 402 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 404 furthermore stores information regarding relationships and associations between entities. Such relationships may be social, professional (e.g., work at a common corporation or organization) interested-based or activity-based, merely for example.

The database 124 also stores annotation data, in the example form of filters, in an annotation table 414. Filters for which data is stored within the annotation table 414 are associated with and applied to videos (for which data is stored in a video table 408) and/or images (for which data is stored in an image table 406). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 406 is so-called "lens" data. A "lens" may be a real-time special effect and sound that may be added to an image or a video.

As mentioned above, the video table 408 stores video data which, in some examples, is associated with messages for which records are maintained within the message table 416. Similarly, the image table 406 stores image data associated with messages for which message data is stored in the entity table 402. The entity table 402 may associate various annotations from the annotation table 414 with various images and videos stored in the image table 406 and the video table 408.

A story table 410 stores data regarding collections of messages and associated image, video, or audio data, which are compiled into a collection (e.g., a story or a gallery). The creation of a particular collection may be initiated by a particular user (e.g., each user for which a record is maintained in the entity table 402). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 5:
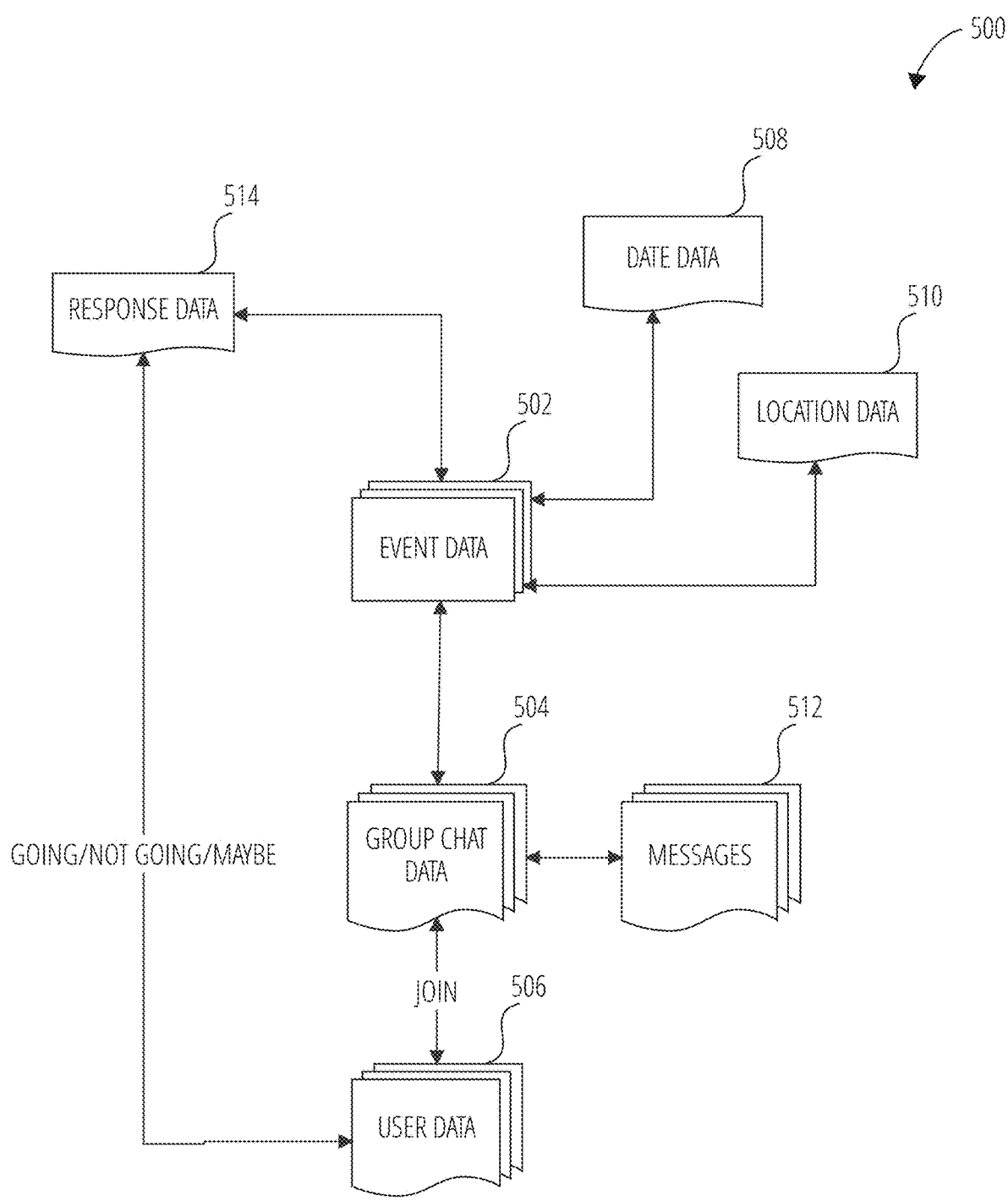
FIG. 5 illustrates a data structure 500 in accordance with some examples.

An event table 412 stores event data, further details of which are provided with reference to FIG. 5.

FIG. 5 is a schematic diagram illustrating a data structure 500 that, in some examples, is maintained by the group messaging system 120. The data structure 500 may be maintained within the tables of the database 124, described with reference to FIG. 4.

The data structure 500 includes event data 502 pertaining to a particular event (e.g., a birthday or other social event), the event data 502 including date data 508 (e.g., a date and time of the relevant event), and location data 510 (e.g., the GPS coordinates of an event location, or an identifier of a building or place at which an event is being hosted). In various embodiments, additional event data 502 may be stored. The event data 502 may further be stored in the event table 412 shown in FIG. 4

Each instance of event data 502 is linked to group chat data 504, which associates a group chat identifier with a number of messages 512 (e.g., stored in the message table 416) that form part of the group chat, as well as user data 506 (e.g., stored in the entity table 402) identifying users that are members of the relevant group chat by having joined or opted in to the group chat. Members of the group chat may contribute messages 512 to the relevant group chat.

Furthermore, the event data 502 may include a response data 514, indicating whether users are attending the relevant event. In some examples, an invitation associated with an event may solicit one of a group of responses from an invited user, the responses including "going", "not going" or "may be going." These responses are associated with users identified within the user data 506, as shown in FIG. 5.

Figure 6:
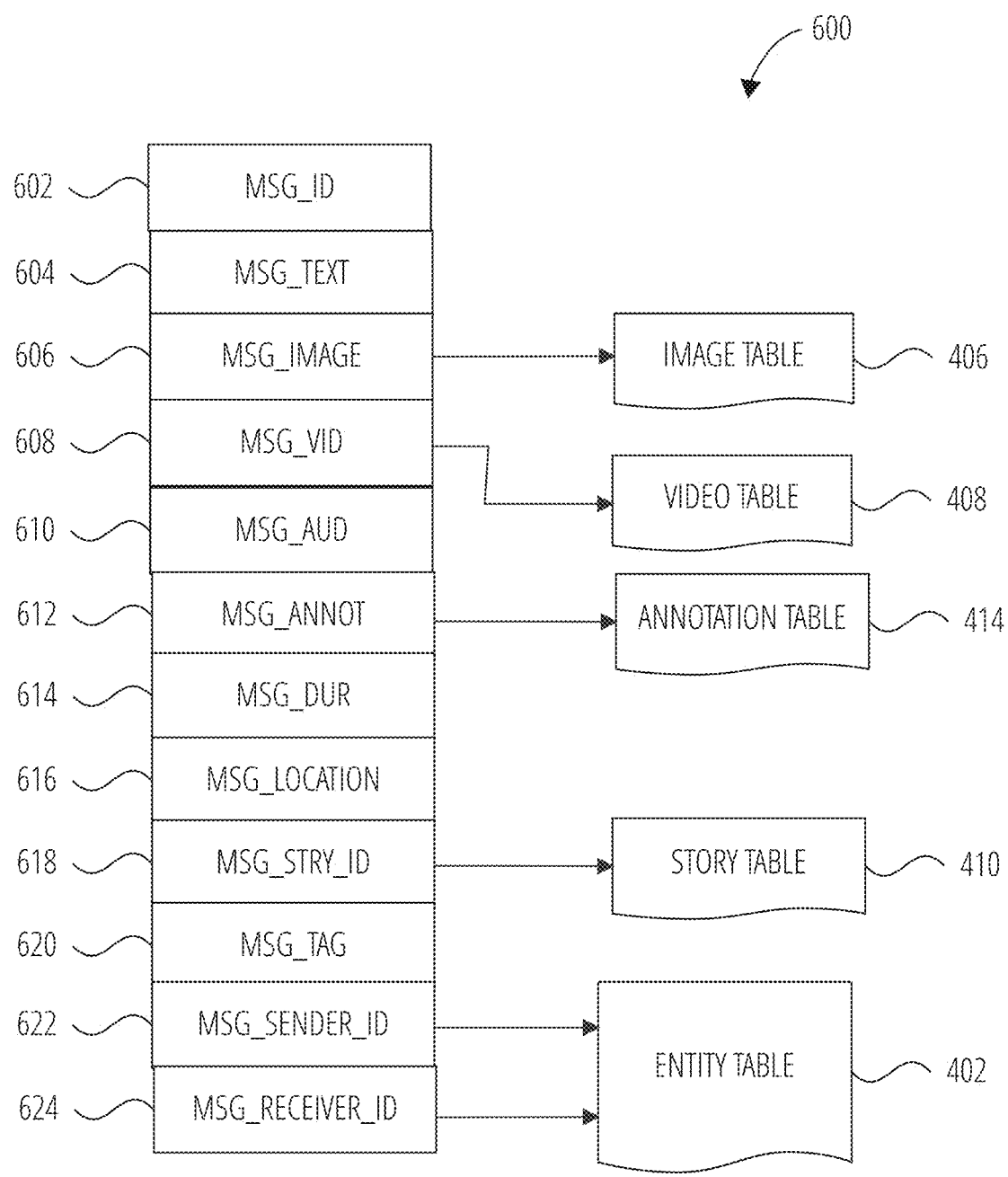
FIG. 6 is a diagrammatic representation of a message, in accordance with some examples.

FIG. 6 is a schematic diagram illustrating a structure of a message 600, according to some in some embodiments, generated by a messaging client application 104 for communication to a further messaging client application 104 or the messaging server application 114. The content of a particular message 600 is used to populate the message table 416 stored within the database 124, accessible by the messaging server application 114. Similarly, the content of a message 600 is stored in memory as "in-transit" or "in-flight" data of the client device 102 or the application server 112. The message 600 is shown to include the following components:

1. A message identifier 602: a unique identifier that identifies the message 600.
2. A message text payload 604: text, to be generated by a user via a user interface of the client device 102, and that is included in the message 600.
3. A message image payload 606: image data, captured by a camera component of a client device 102 or retrieved from a memory component of a client device 102, and that is included in the message 600.
4. A message video payload 608: video data, captured by a camera component or retrieved from a memory component of the client device 102, and that is included in the message 600.
5. A message audio payload 610: audio data, captured by a microphone or retrieved from a memory component of the client device 102, and that is included in the message 600.
6. A message annotation 512: annotation data (e.g., filters, stickers or other enhancements) that represents annotations to be applied to message image payload 606, message video payload 608, or message audio payload 610 of the message 600.
7. A message duration parameter 614: parameter value indicating, in seconds, the amount of time for which content of the message (e.g., the message image payload 606, message video payload 608, message audio payload 610) is to be presented or made accessible to a user via the messaging client application 104.
8. A message geolocation parameter 616: geolocation data (e.g., latitudinal and longitudinal coordinates) associated with the content payload of the message. Multiple message geolocation parameter 616 values may be included in the payload, each of these parameter values being associated with respect to content items included in the content (e.g., a specific image into within the message image payload 606, or a specific video in the message video payload 608).
9. A message story identifier 618: identifier values identifying one or more content collections (e.g., "stories") with which a particular content item in the message image payload 606 of the message 600 is associated. For example, multiple images within the message image payload 606 may each be associated with multiple content collections using identifier values.
10. A message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.
11. A message sender identifier 622: an identifier (e.g., a messaging system identifier, email address, or device identifier) indicative of a user of the client device 102 on which the message 600 was generated and from which the message 600 was sent
12. A message receiver identifier 624: an identifier (e.g., a messaging system identifier, email address, or device identifier) indicative of a user of the client device 102 to which the message 600 is addressed.

The contents (e.g., values) of the various components of message 600 may be pointers to locations in tables within which content data values are stored. For example, an image value in the message image payload 606 may be a pointer to (or address of) a location within an image table 406. Similarly, values within the message video payload 608 may point to data stored within a video table 408, values stored within the message annotations 612 may point to data stored in an annotation table 414, values stored within the message story identifier 618 may point to data stored in a story table 410, and values stored within the message sender identifier 622 and the message receiver identifier 624 may point to user records stored within an entity table 402.

Figure 7:
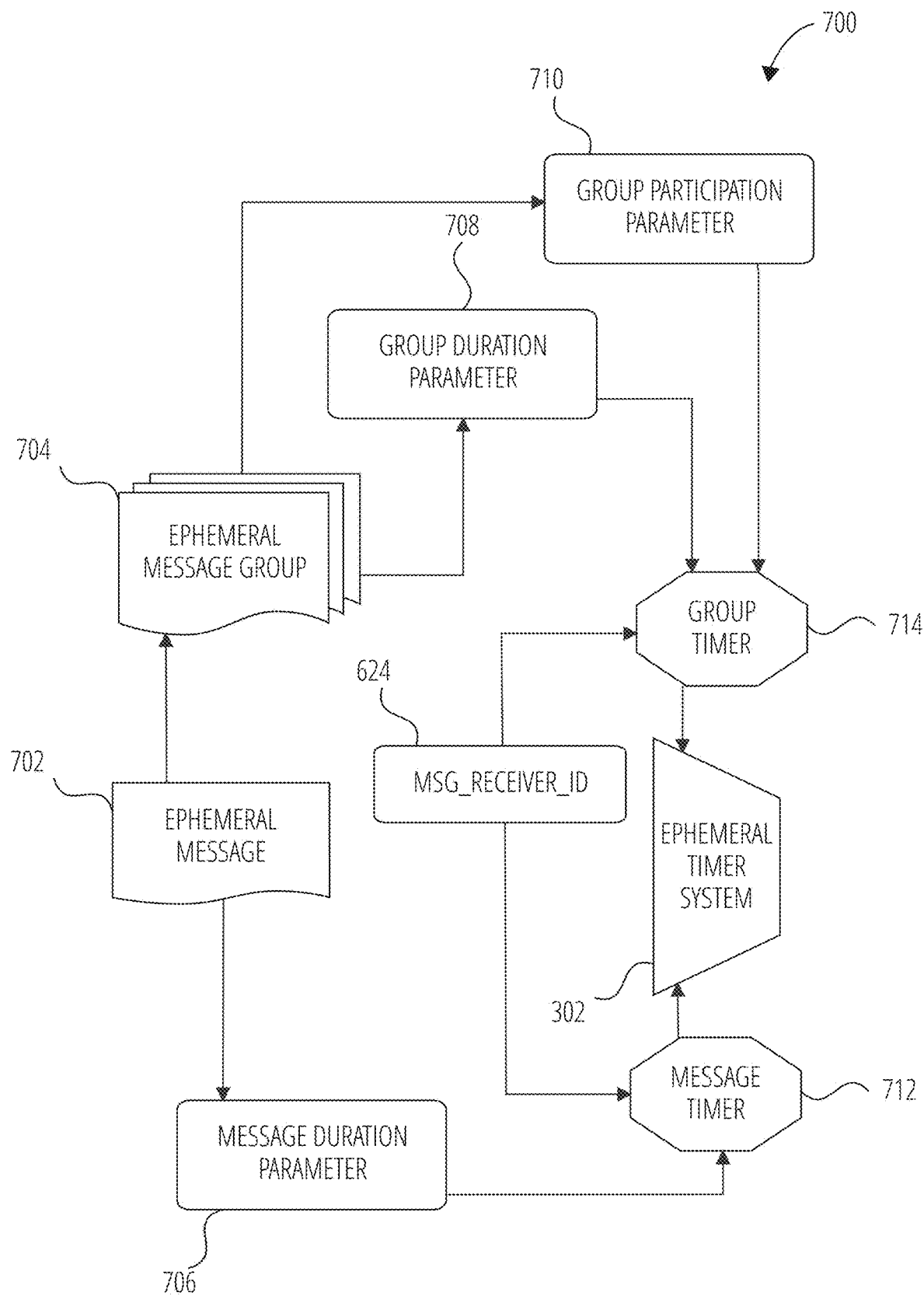
FIG. 7 is a flowchart for an access-limiting process, in accordance with some examples.

FIG. 7 is a schematic diagram illustrating an access-limiting process 700, in terms of which access to content (e.g., an ephemeral message 702, and associated multimedia payload of data) or a content collection (e.g., an ephemeral message group 704) may be time-limited (e.g., made ephemeral).

An ephemeral message 702 is shown to be associated with a message duration parameter 706, the value of which determines an amount of time that the ephemeral message 702 will be displayed to a receiving user of the ephemeral message 702 by the messaging client application 104. In some examples, an ephemeral message 702 is viewable by a receiving user for up to a maximum of 10 seconds, depending on the amount of time that the sending user specifies using the message duration parameter 706.

The message duration parameter 706 and the message receiver identifier 624 are shown to be inputs to a message timer 712, which is responsible for determining the amount of time that the Ephemeral message 702 is shown to a particular receiving user identified by the message receiver identifier 624. In particular, the ephemeral message 702 will be shown to the relevant receiving user for a time period determined by the value of the message duration parameter 706. The message timer 712 is shown to provide output to a more generalized ephemeral timer system 302, which is responsible for the overall timing of display of content (e.g., an ephemeral message 702) to a receiving user.

The ephemeral message 702 is shown in FIG. 7 to be included within an ephemeral message group 704 (e.g., a collection of messages in a personal story, or an event story). The ephemeral message group 704 has an associated group duration parameter 708, a value of which determines a time duration for which the ephemeral message group 704 is presented and accessible to users of the messaging system 100. The group duration parameter 708, for example, may be the duration of a music concert, where the ephemeral message group 704 is a collection of content pertaining to that concert. Alternatively, a user (either the owning user or a curator user) may specify the value for the group duration parameter 708 when performing the setup and creation of the ephemeral message group 704.

Additionally, each ephemeral message 702 within the ephemeral message group 704 has an associated group participation parameter 710, a value of which determines the duration of time for which the ephemeral message 702 will be accessible within the context of the ephemeral message group 704. Accordingly, a particular ephemeral message group 704 may "expire" and become inaccessible within the context of the ephemeral message group 704, prior to the ephemeral message group 704 itself expiring in terms of the group duration parameter 708. The group duration parameter 708, group participation parameter 710, and message receiver identifier 624 each provide input to a group timer 714, which operationally determines, firstly, whether a particular ephemeral message 702 of the ephemeral message group 704 will be displayed to a particular receiving user and, if so, for how long. Note that the ephemeral message group 704 is also aware of the identity of the particular receiving user as a result of the message receiver identifier 624.

Accordingly, the group timer 714 operationally controls the overall lifespan of an associated ephemeral message group 704, as well as an individual ephemeral message 702 included in the ephemeral message group 704. In some examples, each and every ephemeral message 702 within the ephemeral message group 704 remains viewable and accessible for a time-period specified by the group duration parameter 708. In a further embodiment, a certain ephemeral message 702 may expire, within the context of ephemeral message group 704, based on a group participation parameter 710. Note that a message duration parameter 706 may still determine the duration of time for which a particular ephemeral message 702 is displayed to a receiving user, even within the context of the ephemeral message group 704. Accordingly, the message duration parameter 706 determines the duration of time that a particular ephemeral message 702 is displayed to a receiving user, regardless of whether the receiving user is viewing that ephemeral message 702 inside or outside the context of an ephemeral message group 704.

The ephemeral timer system 302 may furthermore operationally remove a particular ephemeral message 702 from the ephemeral message group 704 based on a determination that it has exceeded an associated group participation parameter 710. For example, when a sending user has established a group participation parameter 710 of 24 hours from posting, the ephemeral timer system 302 will remove the relevant ephemeral message 702 from the ephemeral message group 704 after the specified 24 hours. The ephemeral timer system 302 also operates to remove an ephemeral message group 704 either when the group participation parameter 710 for each and every ephemeral message 702 within the ephemeral message group 704 has expired, or when the ephemeral message group 704 itself has expired in terms of the group duration parameter 708.

In certain use cases, a creator of a particular ephemeral message group 704 may specify an indefinite group duration parameter 708. In this case, the expiration of the group participation parameter 710 for the last remaining ephemeral message 702 within the ephemeral message group 704 will determine when the ephemeral message group 704 itself expires. In this case, a new ephemeral message 702, added to the ephemeral message group 704, with a new group participation parameter 710, effectively extends the life of an ephemeral message group 704 to equal the value of the group participation parameter 710.

Responsive to the ephemeral timer system 302 determining that an ephemeral message group 704 has expired (e.g., is no longer accessible), the ephemeral timer system 302 communicates with the messaging system 100 (and, for example, specifically the messaging client application 104) to cause an indicium (e.g., an icon) associated with the relevant ephemeral message group 704 to no longer be displayed within a user interface of the messaging client application 104. Similarly, when the ephemeral timer system 302 determines that the message duration parameter 706 for a particular ephemeral message 702 has expired, the ephemeral timer system 302 causes the messaging client application 104 to no longer display an indicium (e.g., an icon or textual identification) associated with the ephemeral message 702.

Figure 8:
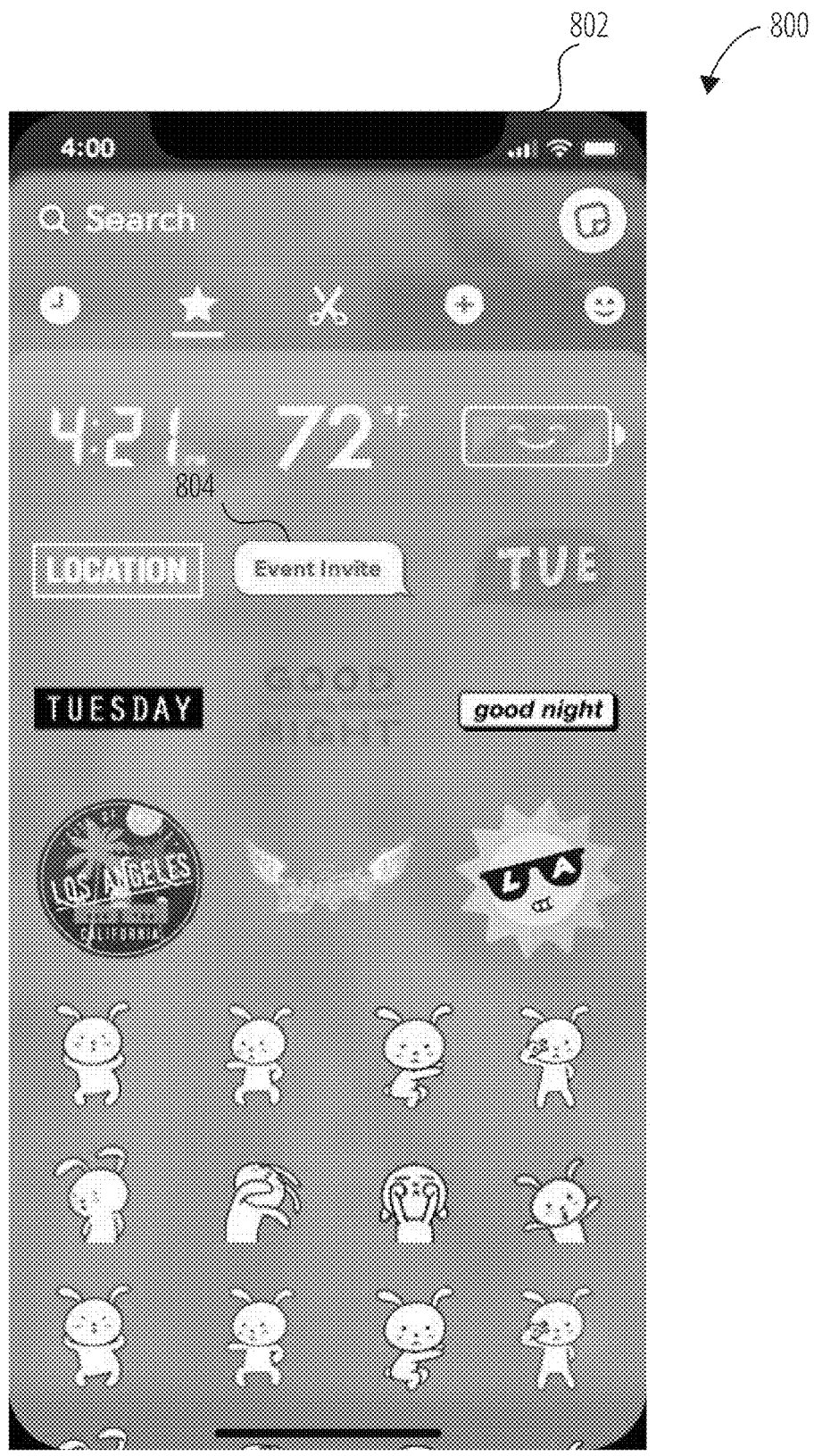
FIG. 8 illustrates a screenshot 800 of a user interface 802 in accordance with some examples.

FIG. 8 is a user interface diagram illustrating a screenshot 800 of a user interface 802 presented by the messaging application, the user interface 802 including an event invitation creation indicium in the form of an event invitation icon 804 that is user selectable by a user to initiate an event invitation creation flow. Responsive to user selection of the event invitation icon 804, the user may be presented with an invitation creation user interface.

Figure 9:
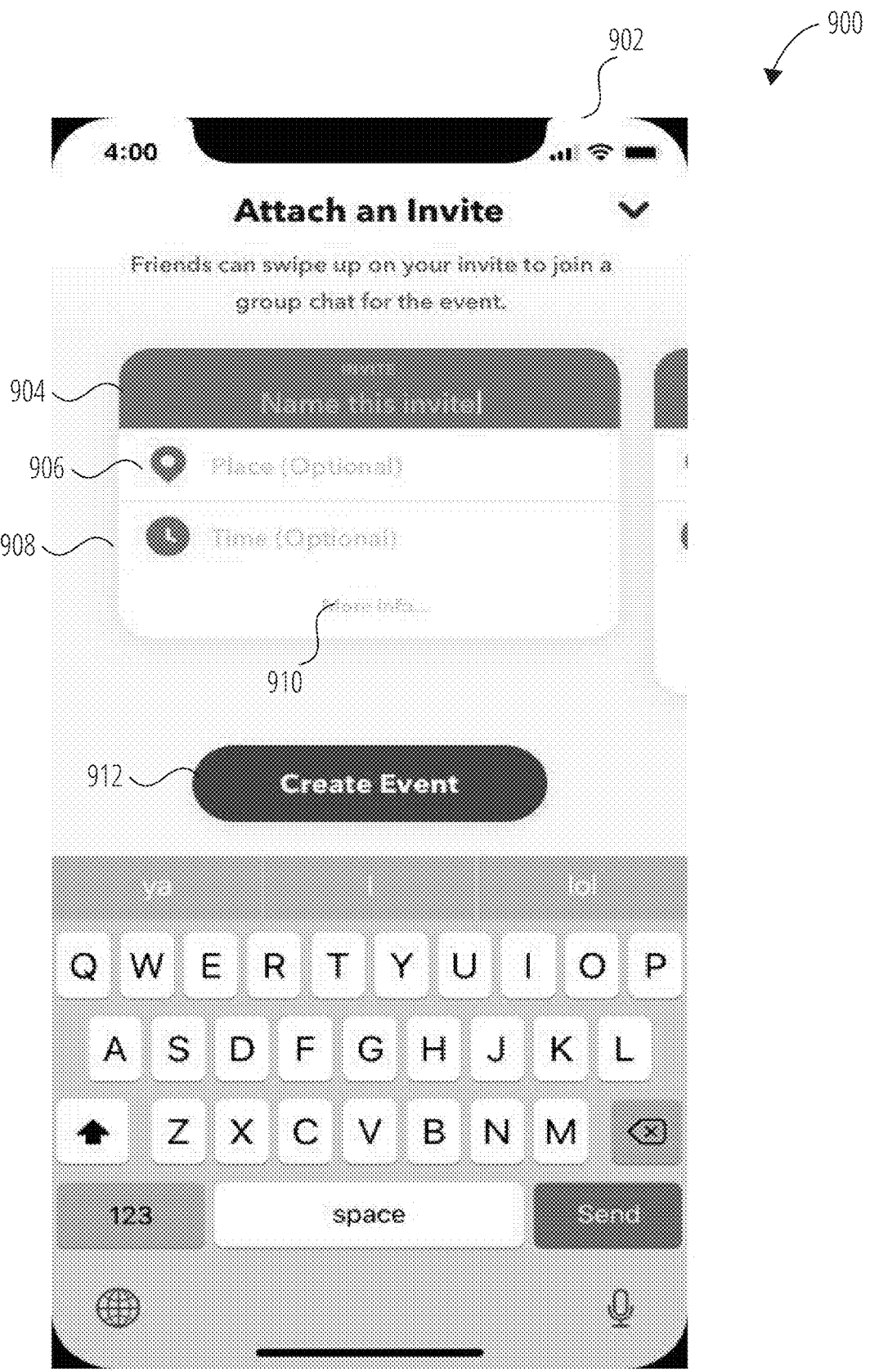
FIG. 9 illustrates a screenshot 900 of a user interface 902 in accordance with some examples.

FIG. 9 is a user interface diagram illustrating a screenshot 900 of an example invitation creation user interface 902, according to some examples, an event name field 904 to receive a name for the event invitation, and event location field 906 to receive a location or place for the event, and an event time field 908 to receive time and date information for the planned event. A further information selection 910 is user selectable to input further information pertaining to the event, while a create event button 912 is user selectable to create an event. It will be appreciated that the information inputted by the user interface 902 will be communicated from the messaging client application 104 to the application server 112, and stored in the data structure 500, described above with reference to FIG. 5, by the group invitation system 120. Further, user selection of the create event button 912 initiates the creation of a respective instance of event data 502 for the relevant event.

Figure 10:
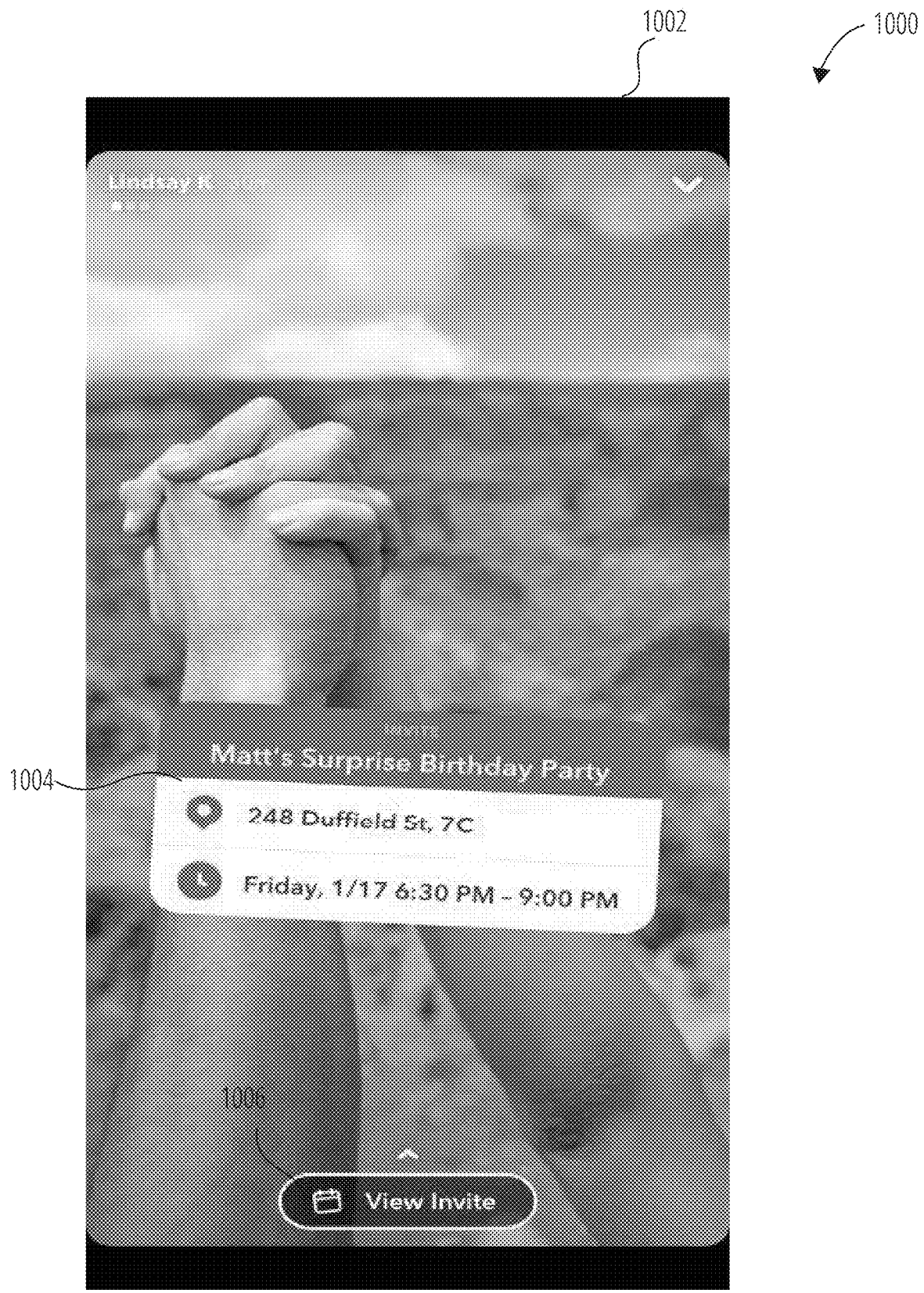
FIG. 10 illustrates a screenshot 1000 of a user interface 1002 in accordance with some examples.

FIG. 10 is a user interface diagram illustrating a screenshot 1000 of an example invitation user interface 1002, within which is displayed a compact event invitation 1004 as may be displayed to an invited user by way of a message communicated using the messaging system 100. The user interface 1002 also includes a view invite selector 1006, which is user-selectable by the invited user in order to view a full version of the event invitation that includes additional details and provides response options. Specifically, responsive to a user selection of the view invite selector 1006, the invited user is presented with an extended event invitation, an example of which is shown in FIG. 11

Figure 11:
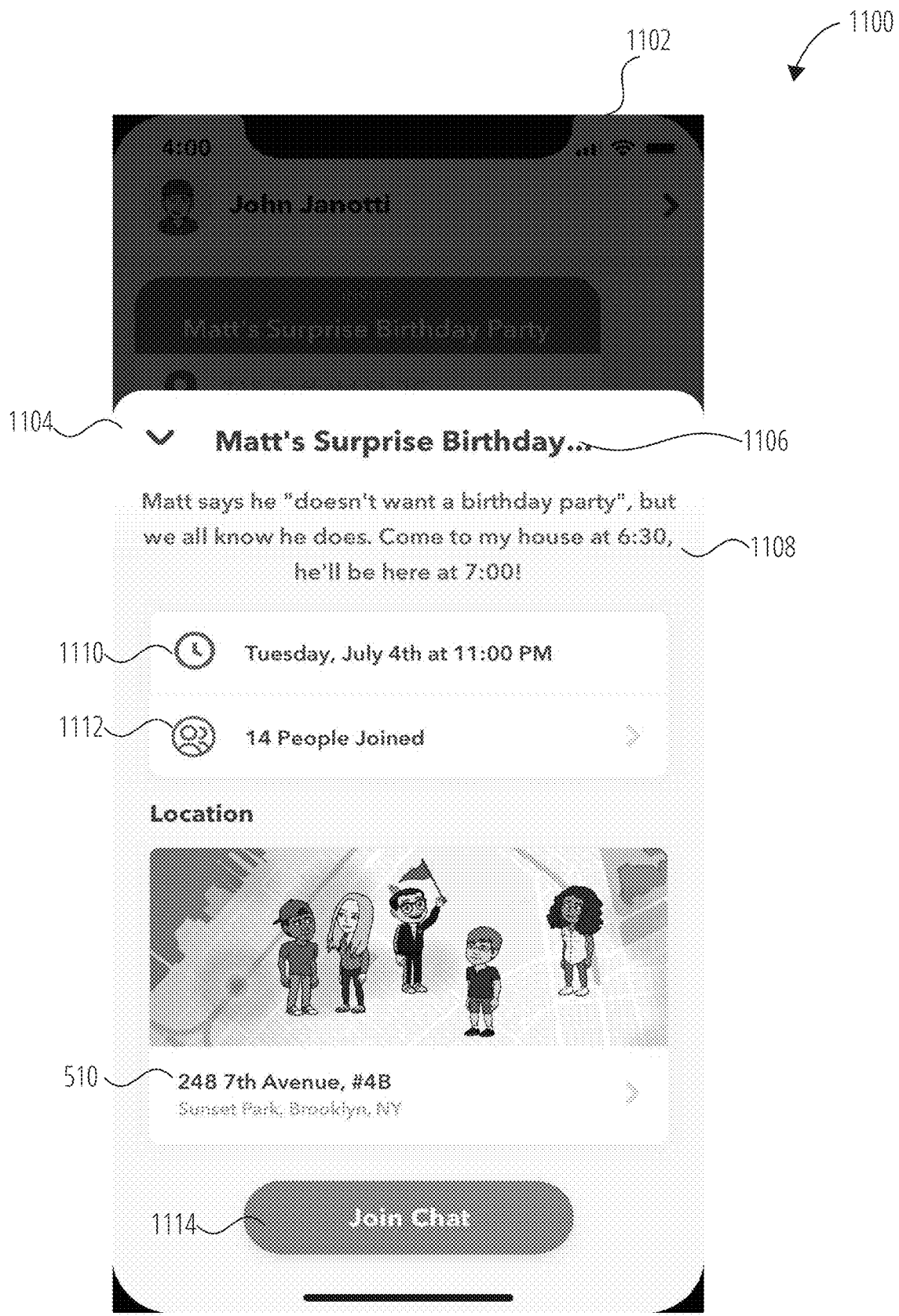
FIG. 11 illustrates a screenshot 1100 of a user interface 1102 in accordance with some examples.

FIG. 11 is a user interface diagram illustrating a screenshot 1100 of an example expanded invitation user interface 1102, on which is displayed and expanded event invitation 1104 which includes event name data 1106, invitation detail data 1108, event date data 1110, event join data 1112 (indicating a number of people that have joined a group chat pertaining to the event), location data 510, and a join chat icon 1114 that is user selectable to join a group chat pertaining to the event. By selectively displaying or emphasizing positive signals (e.g., the number of people that have joined a group chat pertaining to the event), but not displaying (or deemphasizing) negative signals (e.g., showing that a certain number of people have been invited, but only a certain number of people responded), the example group event invitation system seeks to hide negative signals (e.g., inaction) that leads to negative group behavior.

Similarly, it would be appreciated that during a conversation (e.g., a group chat) that any turn event is much easier and less of a commitment than RSVPing to an event per se. Accordingly, the example group invitation system enables a user to conveniently join a conversation and accordingly express interest in a group event, without an upfront commitment to attend or not attend the event. This may, in turn, build positive momentum with respect to the event, and encourage a greater degree of actual downstream attendance of the event.

Figure 12:
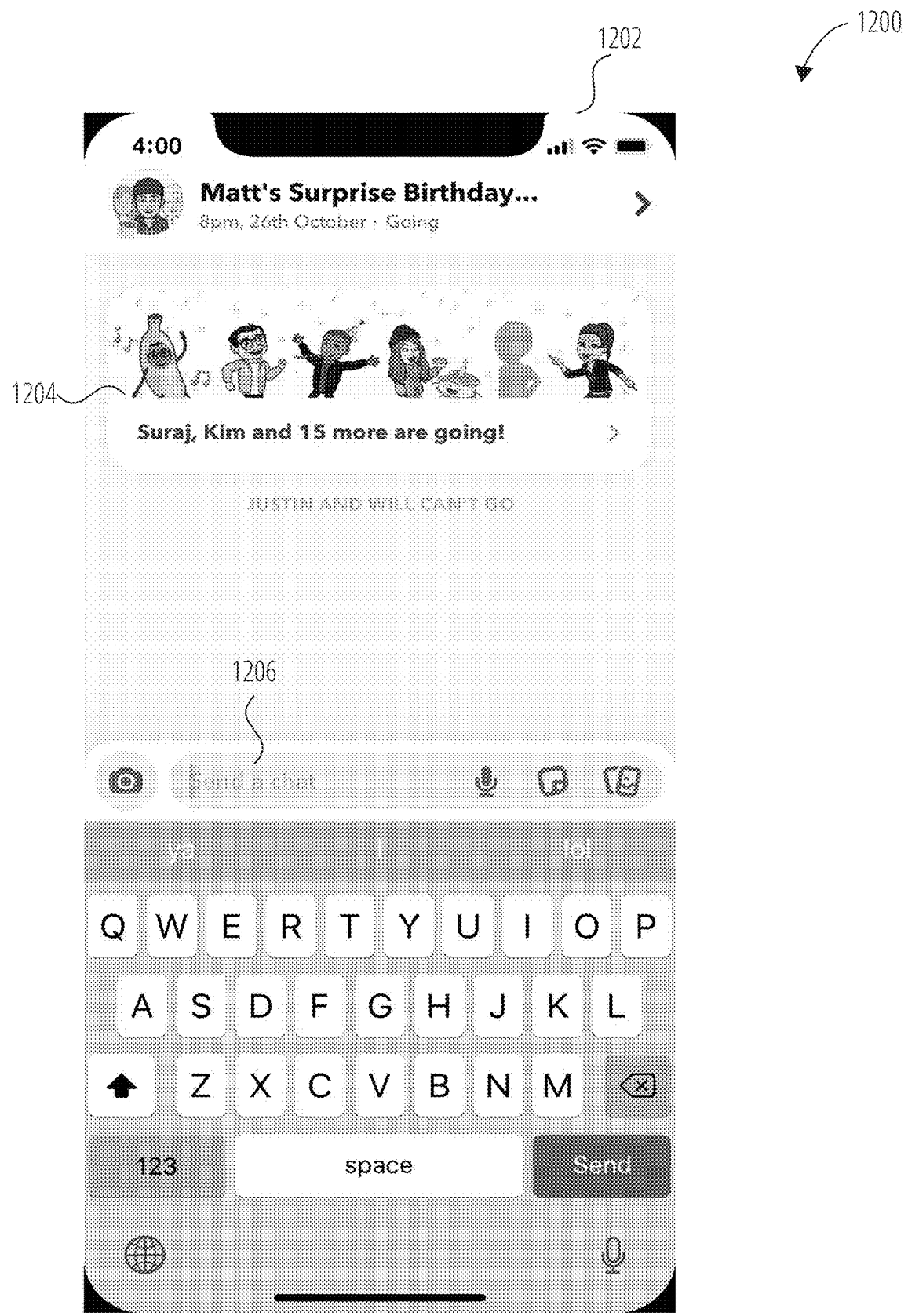
FIG. 12 illustrates a screenshot 1200 of a user interface 1202 in accordance with some examples.

FIG. 12 is a user interface diagram illustrating a screenshot 1200 of an example group chat user interface 1202, which shows messages in a group chat pertaining to a particular event and which is displayed responsive to user selection of the join chat icon 1114. As shown, based on joining an event-related group chat, attendance data 1204 is shown as an initial message, the attendance data 1204 being user-selectable to display further details regarding the event. The interface also includes a message input field 1206, using which a user can contribute to the group chat.

Figure 13:
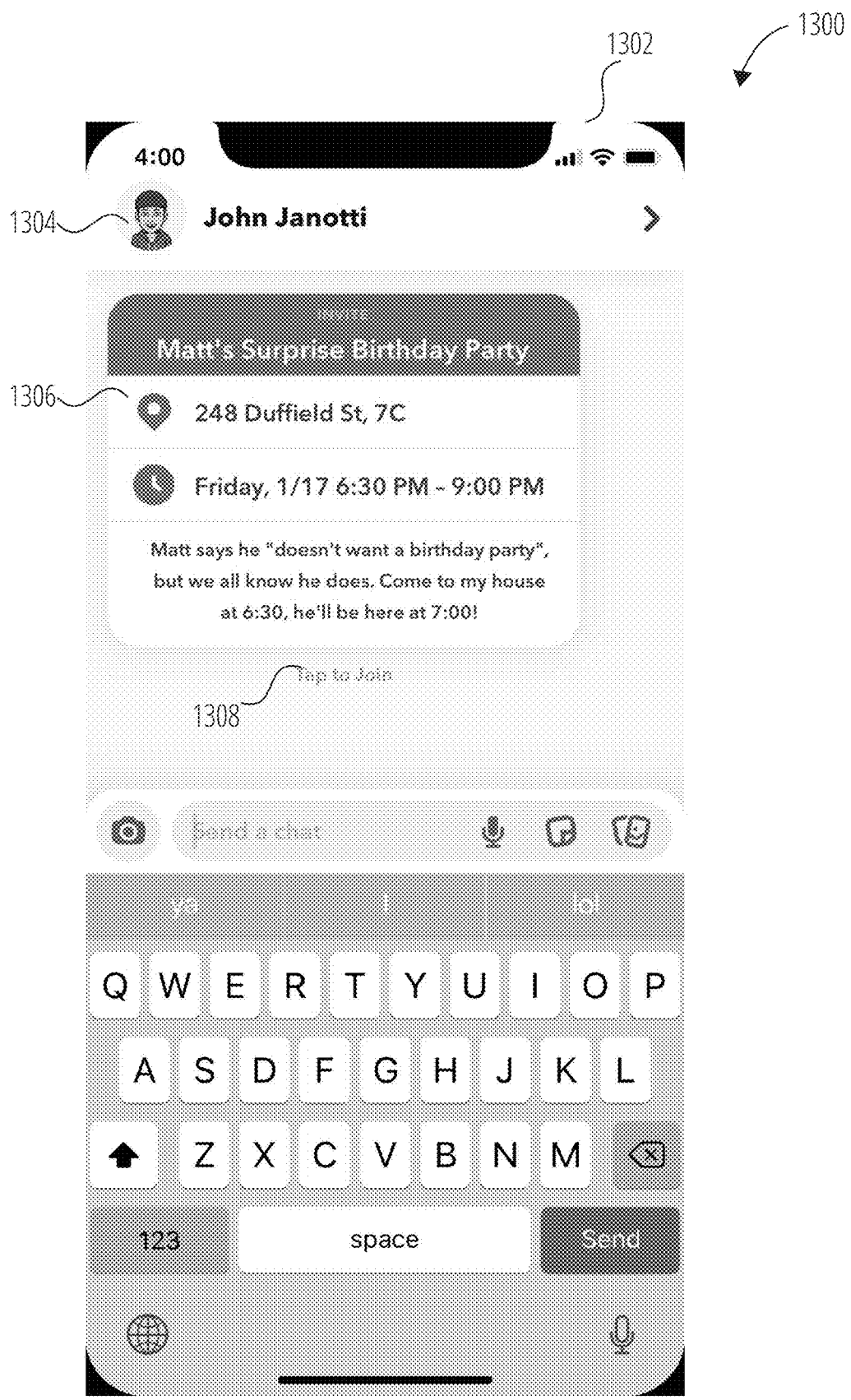
FIG. 13 illustrates a screenshot 1300 of a user interface 1302 in accordance with some examples.

FIG. 13 is a user interface diagram illustrating a screenshot 1300 of an example messaging user interface 1302, as may be presented by the messaging client application, showing the communication of an event invitation message from an inviting user (e.g., message sender), identified by an inviter user identifier 1304. The invitation message comprises event invitation data 1306, as well as a "tap to join" join selector 1308, which is user-selectable by a receiving user in order to join the group chat pertaining to the relevant event. By enabling and inviting user conveniently to send a one-to-one invitation (which includes certain minimum information regarding the event) to an invited user to join a group chat pertaining to an event, the example group invitation system facilitates communication whereby an invited user may feel accountable to respond to the one-to-one direct invitation message from another user.

Figure 14:
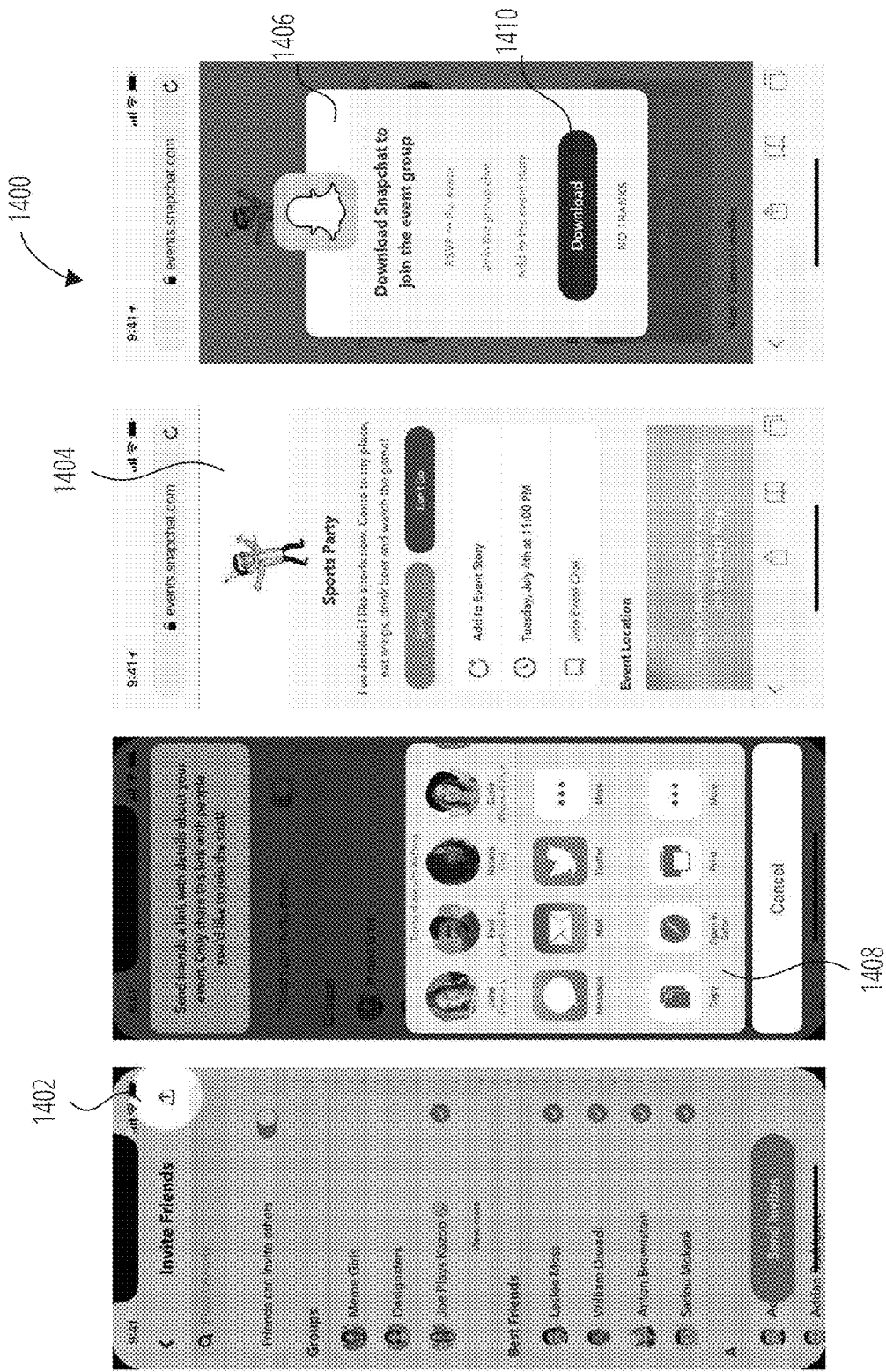
FIG. 14 illustrates a user interface flow 1400 in accordance with some examples.

The example group invitation system 120 also seeks to facilitate the convenient sending of invitations to people that are not users (e.g., registered users or users of the messaging client application 104) of the messaging system 100. FIG. 14 is a user interface diagram illustrating a user interface flow 1400, according to some examples, whereby a network location identifiers in the form of a Uniform Resource Locator (URL) or link to a web-based invitation can be communicated via other communication platforms or mechanisms (e.g., text (e.g., Short Message Service (SMS), email, Twitter, iMessage, etc.), or directly from another application executing on a client device 102 to a person that is not a user of the messaging system 100.

A user selection of a message creation indicium in the form of a share icon 1402 by a user invokes a communication mechanism selection interface 1408, within which a user can select a particular communication mechanism for communicating a network location identifier in the example form of an invitation URL to the recipient via the relevant communication mechanism. The communication mechanism selection interface 1408 may be provided by an operating system of the client device 102, such as the iPhone or Android operating system. The selection interface 1408 may present any number of communication mechanisms or systems available to a user of the client device 102, based on such mechanism supported by the operating system of the client device 102 or third-party applications installed on the client device 102.

Responsive to a user selection of a particular communication mechanism (e.g., text message or email) from within the communication mechanism selection interface 1408, the corresponding communication application (e.g., a text message application or email application) is invoked, and a message created that includes the invitation URL. The invitation URL, in one example, identifies a network resource in the form of an invitation webpage 1404 specific to a particular event. The invitation URL further includes identification information identifying an inviting user (or sending user) of the invitation, as well as one or more invited users (or receiving users). This identification information may be used to customize the presentation of information within the invitation webpage 1404, and also to gather statistics regarding inviting and invited users.

User selection of the invitation URL results in the display of an event invitation interface in the example form of an invitation webpage 1404, using which an invited user can respond to the invitation (e.g., by user selection of the "going", or "can't go" buttons). Additionally, the webpage 1404 includes various event details and a user-selectable indicium in the form of a "join event chat" URL, which is user-selectable to invoke a messaging client application download page 1406. The messaging client application download page 1406, in turn, includes a download URL associated with a download button 1410 that is user-selectable to invoke download of a platform-based messaging client application (e.g., the messaging client application 104). It also is noted that the messaging client application download page 1406 communicates to the invited user the ability to RSVP to the event, join a group chat, and also add to the event media collection using the messaging client application 104.

The download URL, in addition to invoking a download process for the messaging client application 104, also embeds information to automatically join the invited user to the event-centric group chat following a download and installation of the messaging client application 104 on a client device 102 of the invited user. This embedded information may include a unique identifier for the event (e.g., as stored within the event data 502), as well as identifies for both the inviting user and the invited user (e.g., as stored within the user data 506). To this end, a web server 126 forming part of the messaging server system 108 (e.g., running parallel to the Application Program Interface (API) server 110), may create the download URL to include this embedded information, user selection of the download URL serving to pass this information to the downloaded messaging client application 104 either on the server-side (e.g., prior to download), or on the client-side (e.g., on the client device 102 after a download and installation). In this way, the invited user is conveniently joined to the group chat relating to the event, without requiring additional navigation steps of searching advocating the event and issuing a further request to join the group chat.

Figure 15:
FIG. 15 illustrates a user interface sequence 1500 in accordance with some examples.

FIG. 15 is a user interface diagram illustrating a user interface sequence 1500, according to certain examples, that may be presented to a person who is again not a registered user of the messaging system 100, but may wish to receive updates regarding a particular event, while simultaneously presenting a compelling invitation to join the group chat by downloading the messaging client application 104.

Specifically, in this example, a user interface in the form of an invitation webpage 1502 may be presented to an off-platform (e.g., non-registered) user of the messaging system 100, responsive to selection of an invitation URL included within a message received via a third-party messaging system or application, such as that described above with reference to FIG. 14. The invitation webpage 1502, in addition to providing details regarding the relevant event, includes a user-selectable indicium in the form of a "get text updates" button 1504, which is associated with an update URL for a registration interface in the example form of a text (e.g., Short Message Service (SMS)) message sign-up webpage 1506. The webpage 1506, in turn, includes input fields for receiving a mobile telephone number and name from the invited user, which allows the invited user to register (e.g., "sign up") for text message updates regarding the particular event (e.g., regarding changes to event details). Using the webpage 1506, and by inputting the requested information into the input fields, a non-registered user can conveniently be recorded within the messaging system 100 as an update recipient, without requiring that the nonregistered user register with the messaging system 100, or download and install the messaging client application 104. This, in turn, facilitates a degree of engagement by the nonregistered user that may be non-threatening and very easy to perform, with a minimum commitment to attend the event or participate in any communications pertaining thereto.

The invitation webpage 1502 also includes a further user-selectable indicium in the form of a "join the chat" button 1508, which is distinct from the button 1504 and is associated with a join URL for a further registration interface in the example form of a messaging client application sign up webpage 1510. The webpage 1510 includes a number of input fields using which an invited user can register with the messaging system 100, and also be automatically added to a group chat pertaining to the event and download of the messaging client application 104, as described above with reference to FIG. 14. In this example, the webpage 1510 may include a register button, that is user-selectable to invoke download of the messaging client application 104, and registration of the user both within the messaging system 100, and also specifically as a participant within the group chat.

Figure 16:
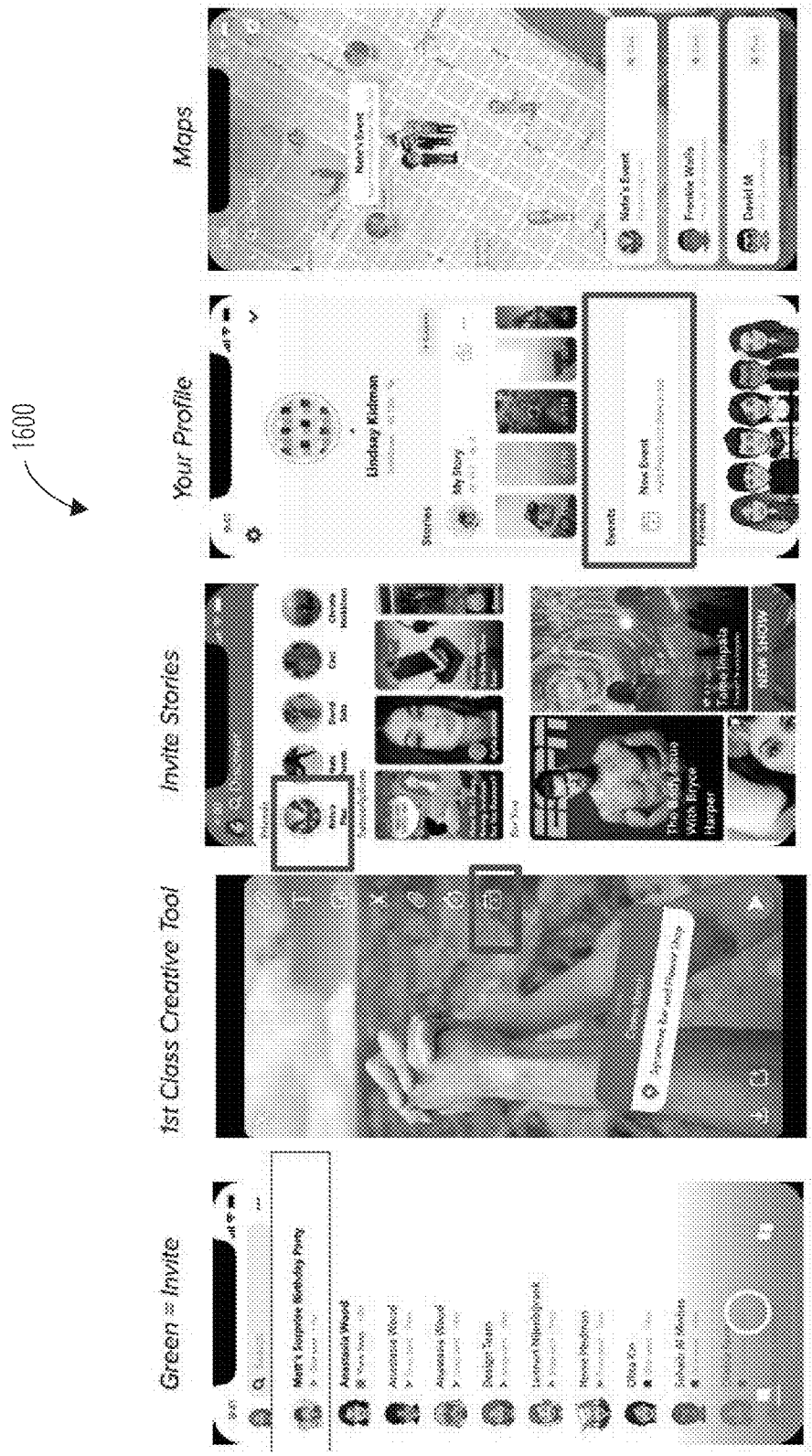
FIG. 16 illustrates screenshots 1600 in accordance with some examples.

FIG. 16 is a user interface diagram illustrating screenshots 1600 of various user interfaces that may be presented by the messaging client application 104 and in which event information is surfaced in order to make this information readily discoverable by users of the messaging client application 104

Figure 17:
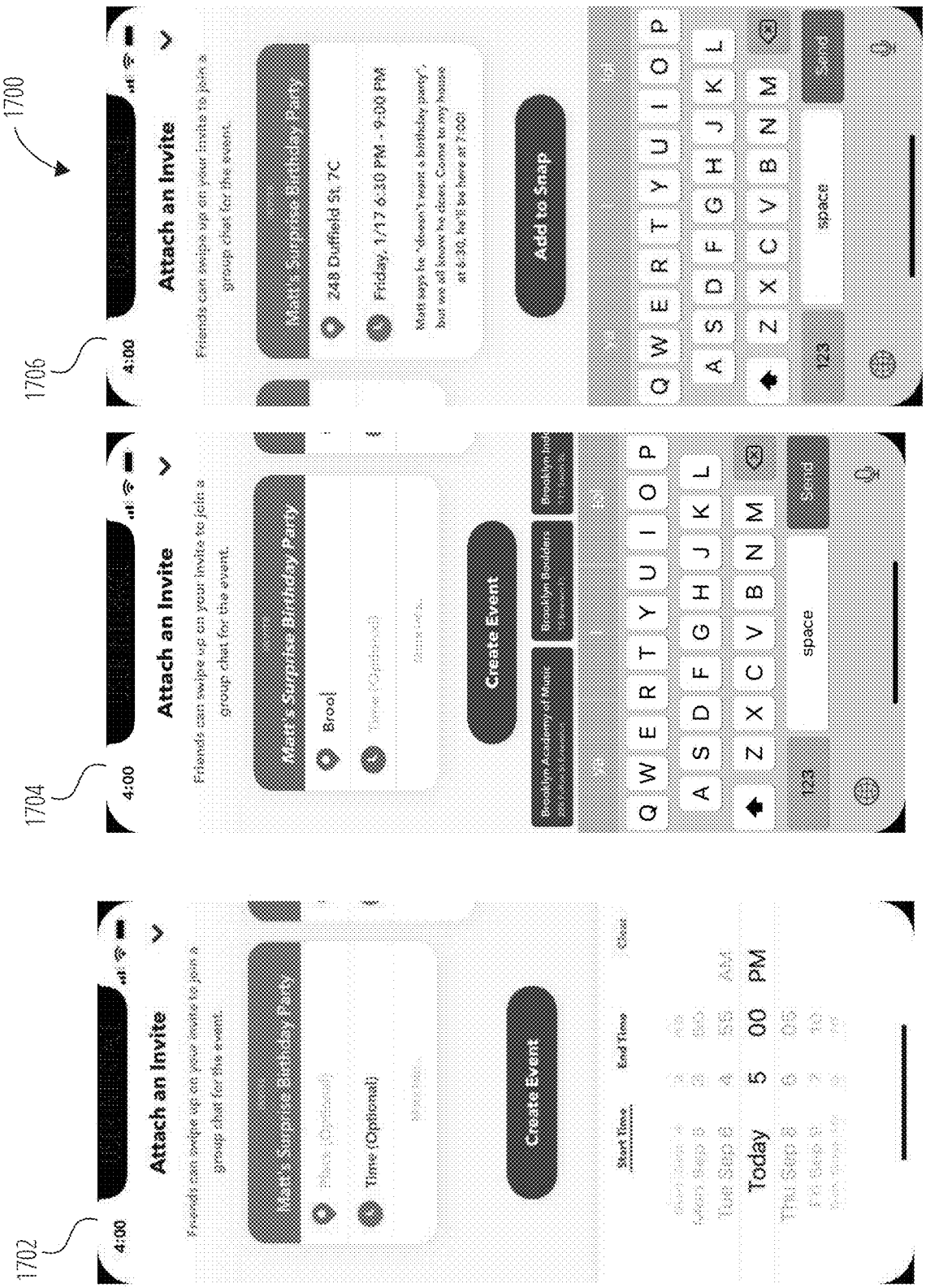
FIG. 17 illustrates screenshots 1700 of a user interface 1702 and user interface 1704 in accordance with some examples.

FIG. 17 is a user interface diagram illustrating screenshots 1700 of a sequence of interfaces that may be presented to assist the user in composing and creating an invitation to an event, which can be communicated to other users of the messaging system 100 via a chat message, or to off-platform people who are not users of the messaging system 100 by means of a URL (or other link) to a network resource that will cause the display of invitation information to the off-platform person.

A first user interface 1702 shows a time entry scroll mechanism that a user can conveniently manipulate to specify a time for an event.

A second user interface 1704 illustrates a predictive event location name mechanism, whereby a predictive spelling function services the names of potential event locations based on letters entered into the event location field of event creation interface.

A third user interface 1706 includes an "add to snap" button, which is user-selectable to add the event invitation to an image-based message as an image overlay or modification. Specifically, a graphic depicting details of the event the image processing system 116, and overlaid on an image (e.g., a photograph) that is included in the message communicated by the user. In this case, the graphic may be user-selectable by a recipient of the image-based message in order to join a group chat pertaining to the event, or even to respond (e.g., RSVP) to the invitation.

Figure 18:
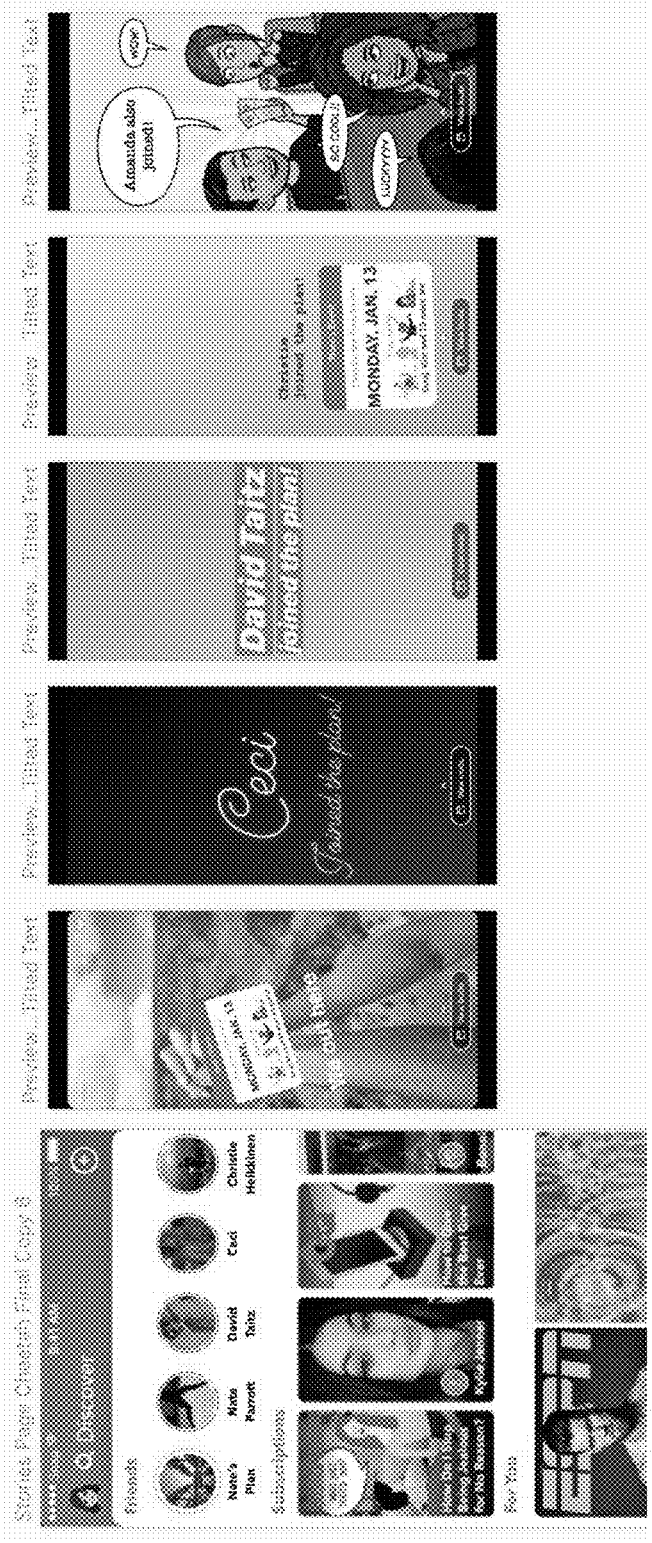
FIG. 18 illustrates screenshots 1800 in accordance with some examples.

FIG. 18 is a user interface diagram illustrating screenshots 1800 of a number of example user interfaces showing the integration of event information within collections of media content (e.g., stories), by the collection management system 304. Specifically, an event invitation image, together with updated information pertaining to the event (e.g., announcing that a specific user as it joined the group chat or is planning to attend the event) may be displayed within an automatically created event story around a particular event. To this end, the collection management system 304 may interface with the group invitation system 120 in order to automatically create a media collection (e.g., created by the collection management system 304) that is presented to members of a group chat, as reflected in the group chat data 504.

Figure 19:
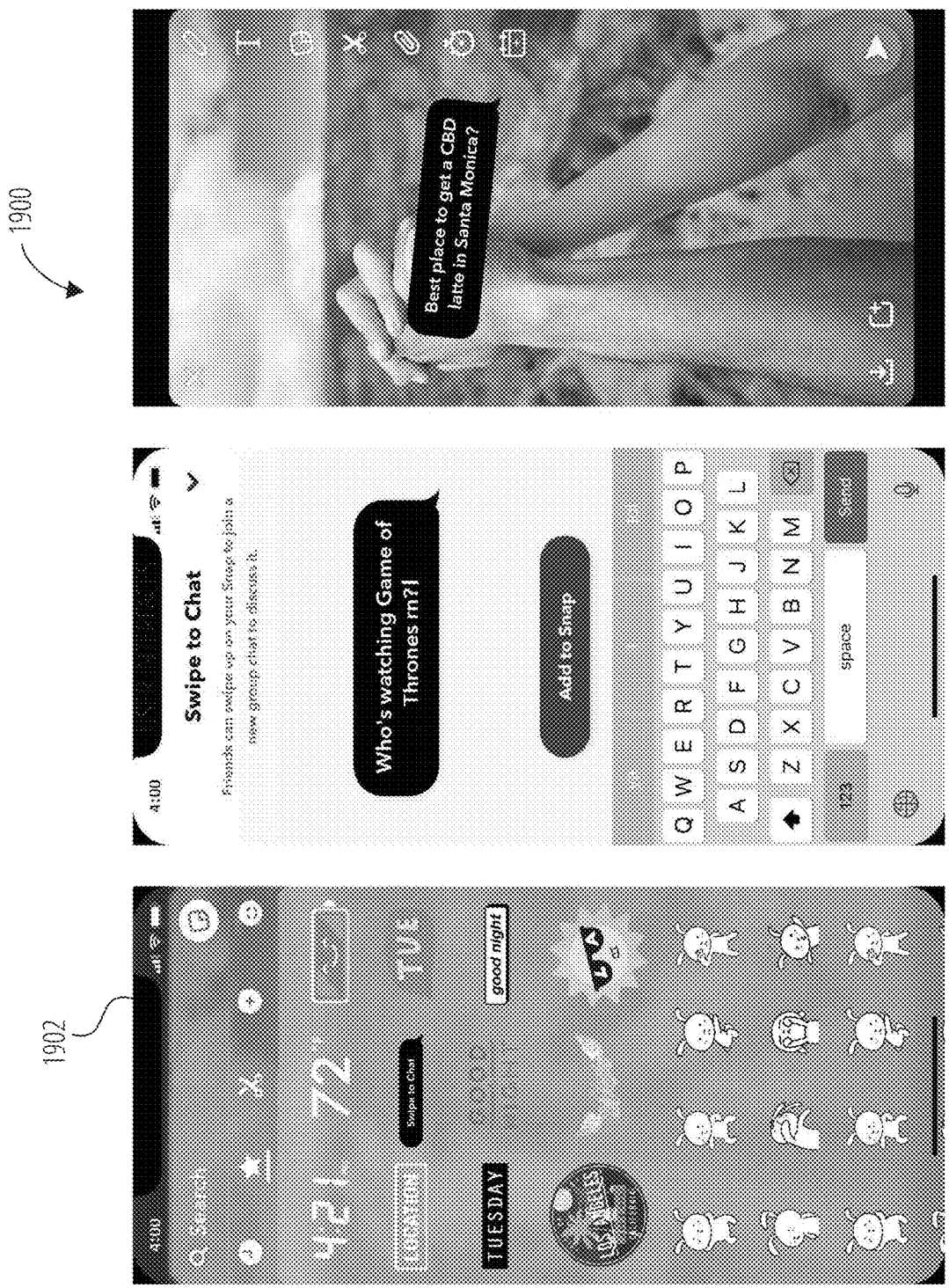
FIG. 19 illustrates screenshots 1900 in accordance with some examples.

FIG. 19 is a user interface diagram illustrating screenshots 1900 of a number of example user interfaces 1902 including "join a group" icons (or stickers) that invite a user to join a group chat, without providing event-specific details.

Figure 20:
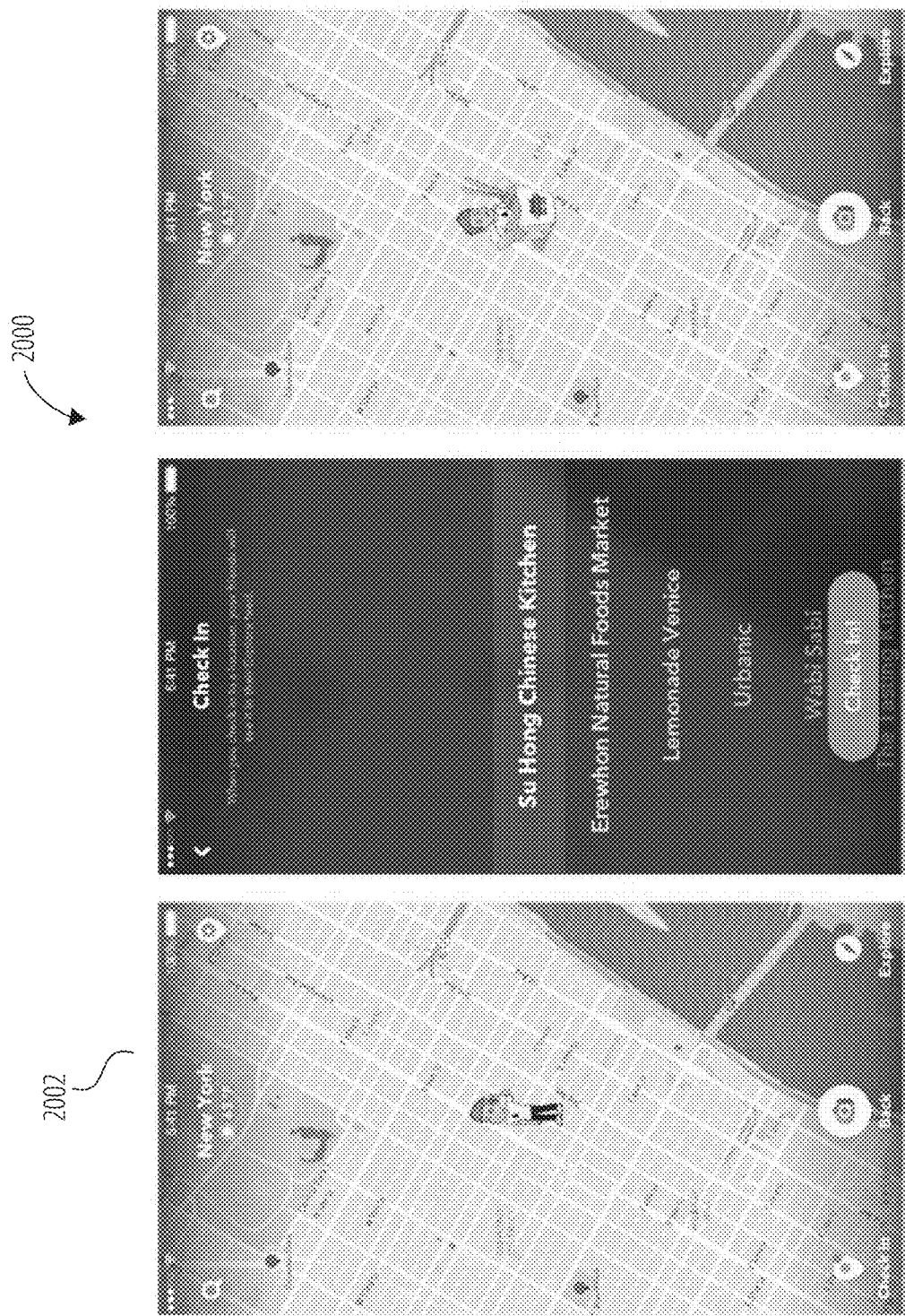
FIG. 20 illustrates screenshots 2000 in accordance with some examples.

FIG. 20 is a user interface diagram illustrating screenshots 2000 of a number of user interfaces user interfaces 2002 that illustrate a map check-in feature of the messaging client application 104 as providing an entry point into an invitation to an event. Specifically, responsive to performing a checking operation at a location via the messaging client application 104, an invitation to an event (or to join a chat pertaining to an event) at or within a predetermined proximity of the checking location may be presented to the user performing the map check-in.

Figure 21:
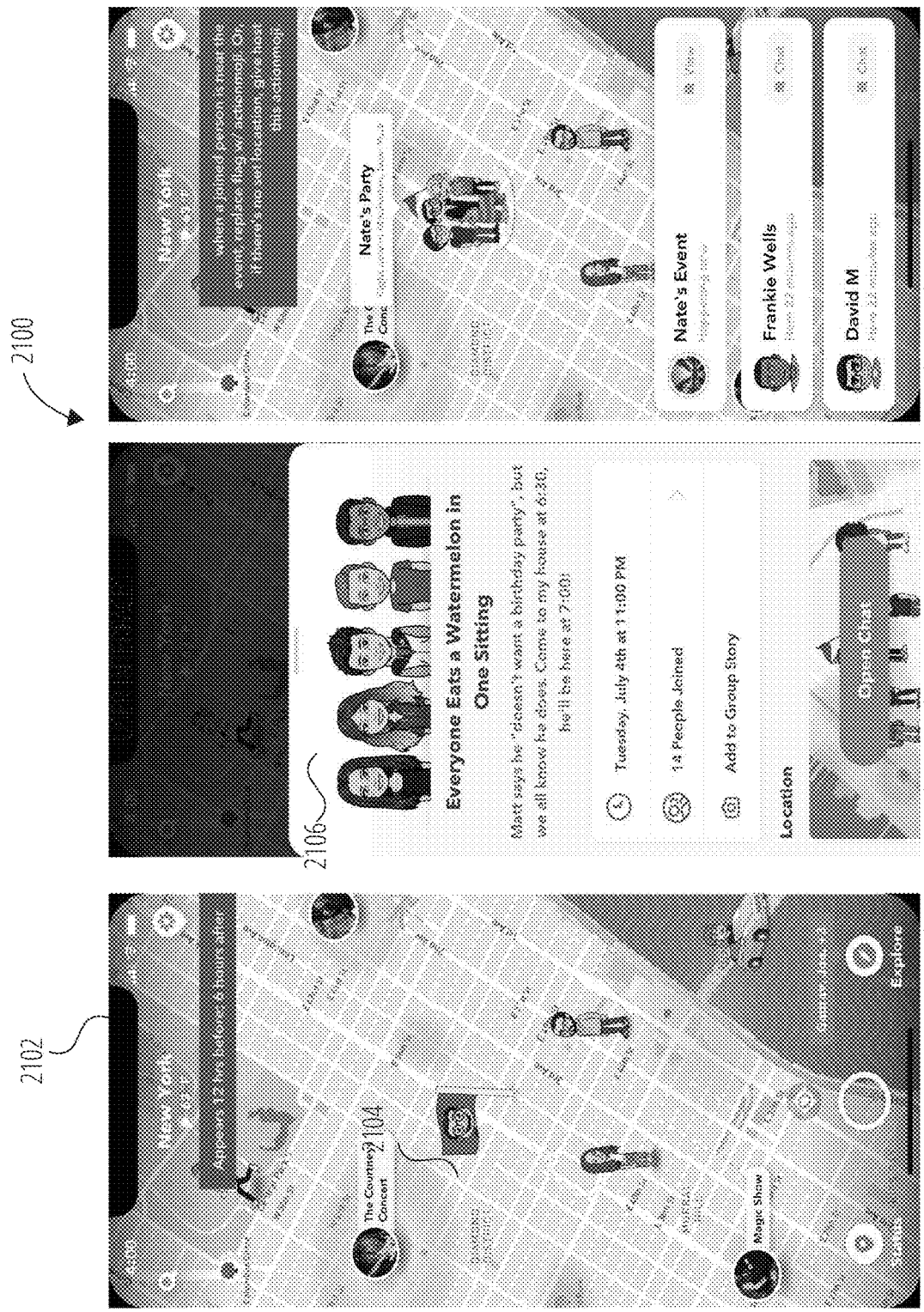
FIG. 21 illustrates screenshots 2100 in accordance with some examples.

FIG. 21 is a user interface diagram illustrating screenshots 2100 of a number of user interfaces 2102 that show further integration between a map (or geolocation) function of the messaging client application 104 and the group invitation system 120. Specifically, an event icon 2104 (e.g., a flag) may be displayed within a map interface of the messaging client application 104 within a predetermined number of hours before the start of an event, and a predetermined number of hours after the start of the event). The event icon 2104 is user selectable to invoke display of an event invitation 2106 using which a user can request to be added to a group chat pertaining to the event, and also added to a group story related to the relevant event. When a "joined" user is determined by the messaging client application 104 to be within a predetermined proximity of the actual event, the event icon 2104 may be updated to indicate an action (e.g., invite the user to participate within a discussion on the group chat regarding the event). In this way, a user that has joined the group chat may be prompted to provide updates regarding his or her location, and other information pertinent to the event, as the event is approached. Further, additional information regarding the event, as gleaned from the group chat, may also be displayed more prominently within the user interface to a user once within a predetermined geographic proximity within predetermined time parameters surrounding the start and/or end of the event.

Figure 22:
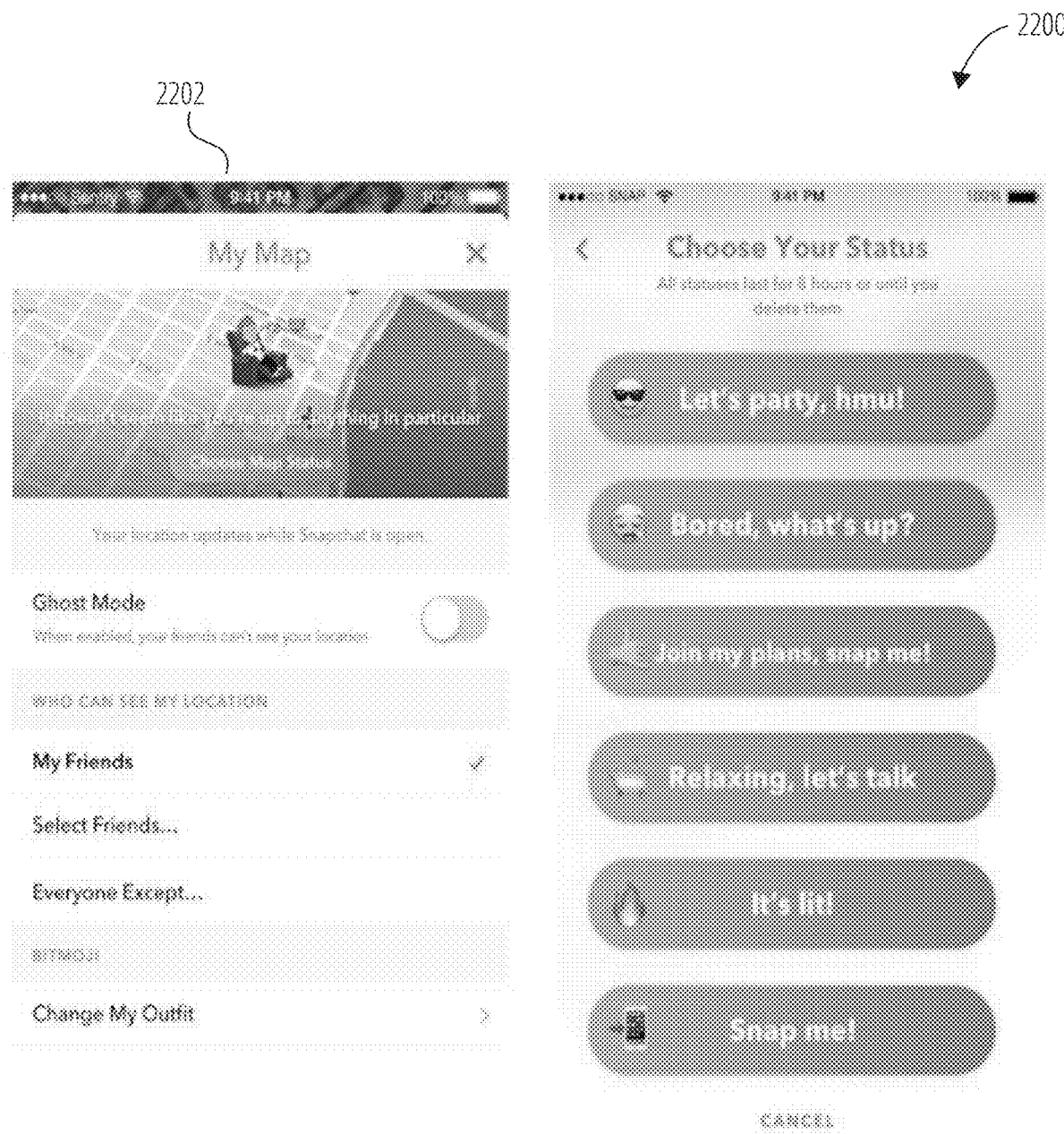
FIG. 22 illustrates screenshots 2200 in accordance with some examples.

FIG. 22 is a user interface diagram illustrating screenshots 2200 of further user interfaces 2202 that show even further integration between the maps (or geolocation) function of the messaging client application 104 and the group invitation system 120. The user interfaces 2202 illustrate a number of status updates that a user may select to be presented to friends or other groups of users of the messaging system 100. The status information may be presented in association or conjunction with and event icon 2104 related to the event on a maps interface.

Figure 23:
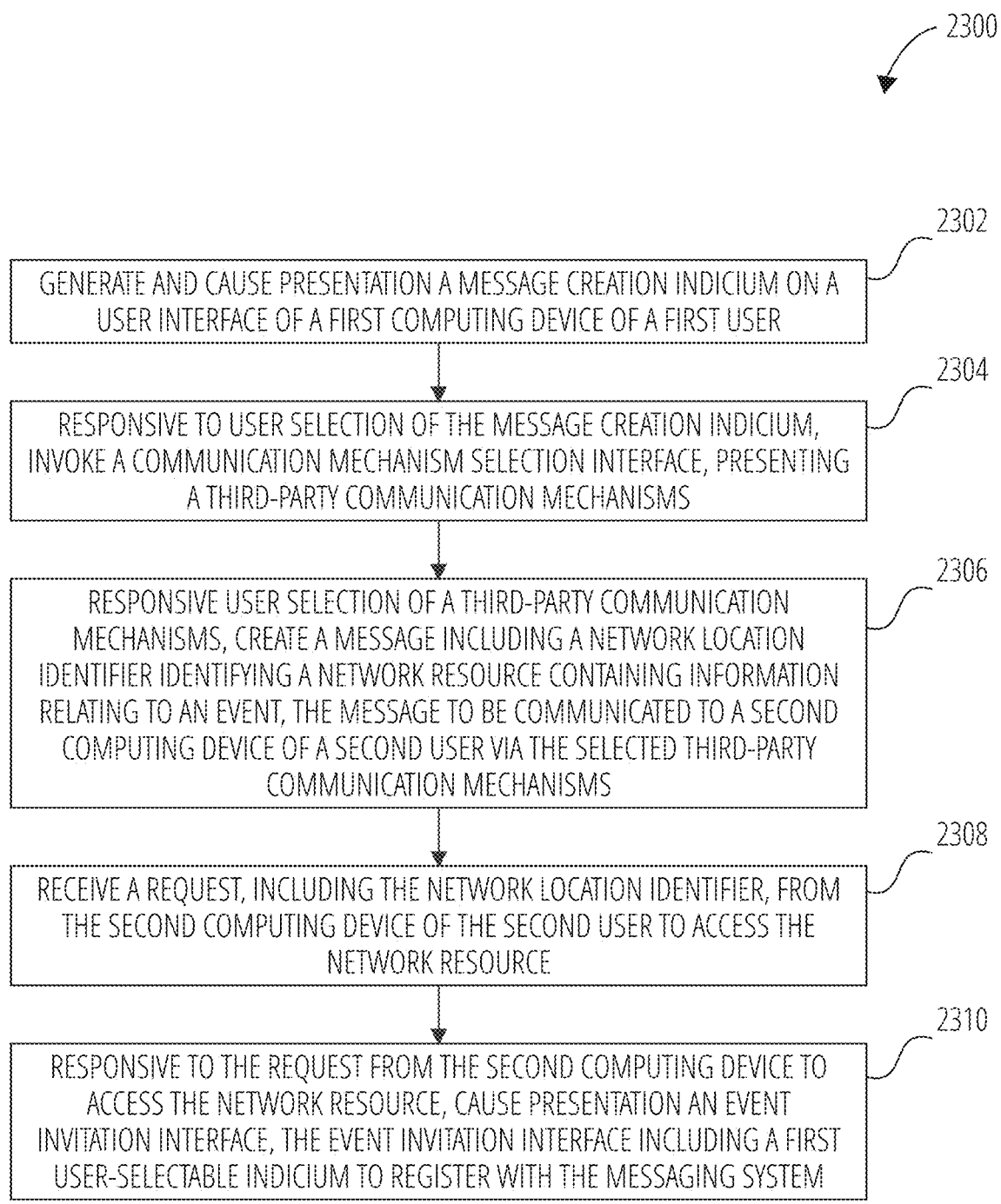
FIG. 23 illustrates a method 2300 in accordance with some examples.

FIG. 23 is a flowchart illustrating a method 2300, according to some examples, to facilitate messaging by a messaging system (e.g., messaging system 100) with off-platform entities (e.g., people).

The method 2300 commences at block 2302, with the generation, using one or more processors of the client device 102 and the messaging server system 108, of message creation indicium on a user interface of a first computing device of a first user. For example, the messaging client application 104, executing on the client device 102, may generate the share icon 1402 as part of the interface, as shown in FIG. 14.

At block 2304, responsive to user selection of the share icon 1402, a mechanism selection interface (e.g., selection interface 1408) is generated and presented to a user of the messaging client application 104. Specifically, the selection interface 1408 presents a number of third-party communication mechanisms (e.g., text (or SMS) messaging, email, Twitter, etc.) that may be selected by the user for communication of a message.

At block 2306, and responsive user selection of a selected communication mechanism, the messaging client application 104 creates a message including a network location identifier (e.g., a URL) identifying a network resource (e.g., the webpage 1404) containing information relating to an event. This message is created in a format to be communicated to a second computing device (e.g., a client device 102) of a second user via the selected third-party communication mechanism(s).

At block 2308, the messaging server system 108 receives a request, including the network location identifier, from the second computing device (e.g., the client device 102) of the second user to access the network resource (e.g., the webpage 1404). At block 2310, and responsive to the request from the second computing device to access the network resource, the messaging server system 108 generates and causes presentation an event invitation interface (e.g., the webpage 1404 or the webpage 1510), the event invitation interface including a first user-selectable indicium (e.g., the download button 1410, the button 1504 or the button 1508) to register with the messaging system.

In one example, first user-selectable indicium is user-selectable to generate and cause presentation of a third-party communication platform interface (e.g., the webpage 1506)

to receive third-party communication platform recipient data for the second user, so as to enable the messaging system 100 to provide updates pertaining to the event to the second user via the third-party communication platform. The third-party communication platform may be an SMS platform, and the recipient data for the second user comprises a mobile telephone number.

The first user-selectable indicium may also be user-selectable to generate and sent a registration request from the second computing device to generate a registration interface. In this case, responsive to receiving the registration request from the second computing device, the messaging server system 108 generates and causes presentation a registration interface (e.g., webpage 1506 or webpage 1510) to receive registration information from the second user.

The first user-selectable indicium may also be user-selectable to invoke to download a platform-based messaging client application (e.g., messaging client application 104) associated with a messaging system (e.g., the messaging system 100) to the second computing device (e.g., client device 102), and to join the second user to a group chat, hosted by the messaging system and pertaining to the event.

In one or more examples, the first user-selectable indicium is user-selectable to issue a request to the messaging system (e.g., messaging system 100) to download the platform-based messaging client application (e.g., messaging client application 104), the request further including a user identifier associated with the second user and an event identifier associated with the event, the user identifier and the event identifier being used by the messaging system to join the second user to the group chat pertaining to the event.

The event invitation interface may also include a second user-selectable indicium, distinct from the first user-selectable indicium, the first user-selectable indicium (e.g., button 1508) being user-selectable to generate a request for a user registration interface to register a user as a user of a customized messaging application associated with the messaging system and the second user-selectable indicium (e.g., button 1504) being used-selectable to generate a request for a third-party communication platform interface to register a user to receive updates pertaining to the event via the third-party communication platform.

In some examples, the request to access the network resource further includes an identifier for the first user so that the network resource (e.g., webpage 1404) may be customized for the first user. Further, an event invitation interface (e.g., webpage 1404) includes an invitation response indicium that is user-selectable by the second user to provide a response to an invitation to attend the event.

Figure 24:
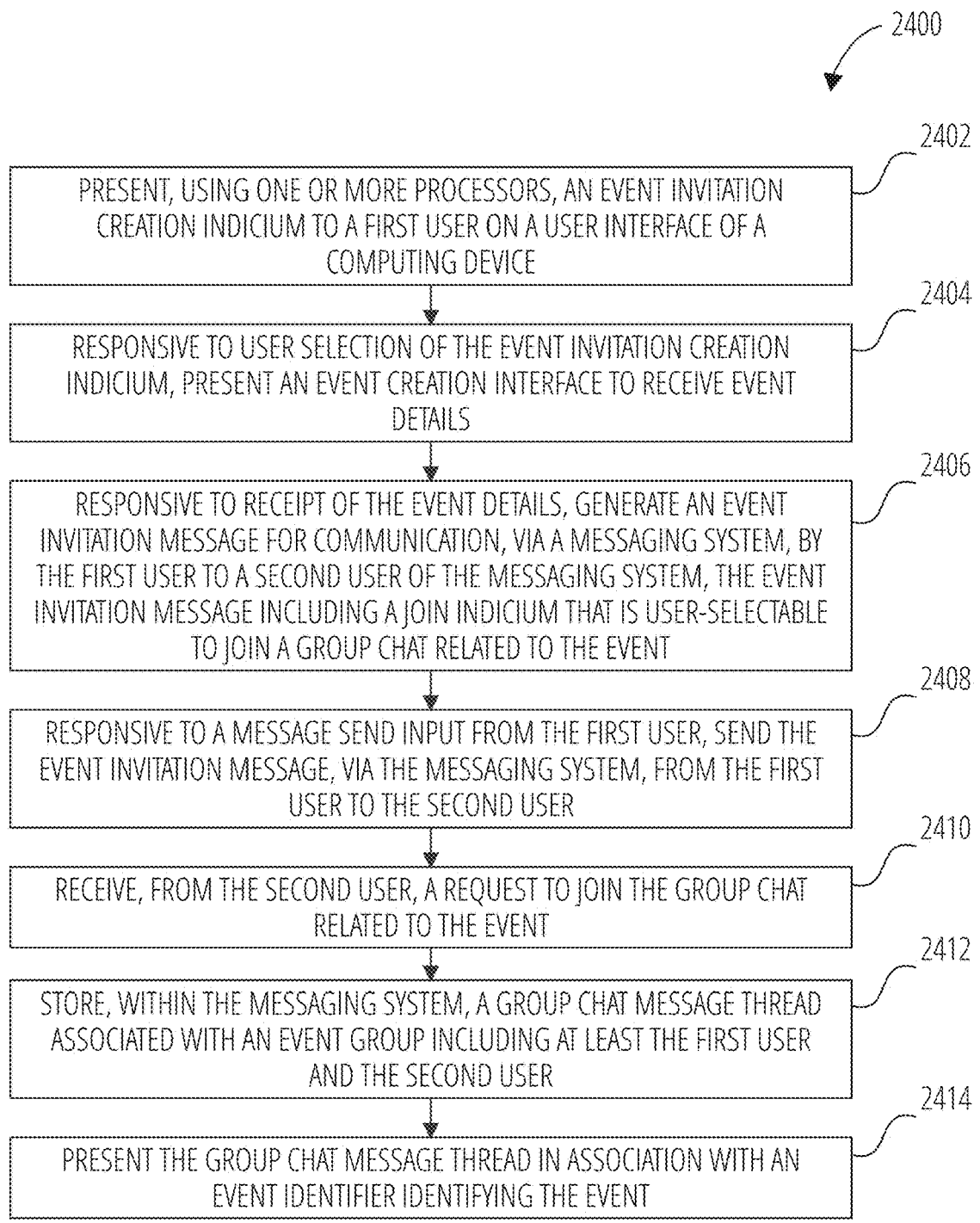
FIG. 24 illustrates a method 2400 in accordance with some examples.

FIG. 24 is a flowchart illustrating a method 2400, according to some examples, to manage an event invitation in a computer network to the environment. The method 2400 is performed by the messaging system 100, and commences at block 2402 with the presentation, using one or more processors (e.g., of the client device 102 or the messaging server system 108), of an event invitation creation indicium (e.g., the event invitation icon 804 shown in FIG. 8) within the context of a user interface (e.g., the user interface 802). The user interface may be presented as one of multiple user interfaces displayed on a display screen of the client device 102 by the messaging client application 104.

At block 2404, and responsive to a user selection of the event invitation creation indicium, the messaging client application 104 presents an event creation interface (e.g., the event creation user interface 902) to a user, this interface to receive event details as described above with reference to FIG. 9.

At block 2406, responsive to receipt of the event details (e.g., received responsive to user selection of the create event button 912), an event invitation message is generated. This event invitation message may be created as an interactive image overlay, such as the event invitation 1004 shown above in FIG. 10 that a user can then communicate as part of a multimedia message via the messaging system 100 to another user. The interactive image overlay is user-selectable to cause presentation of details of the event, and to join a group chat pertaining to the event, as is illustrated above and described with reference to FIG. 11). To this end, the event invitation message includes a join indicium (e.g., the join chat icon 1114) that is user-selectable to join the group chat related to the event.

Responsive to receipt of a send message input from an inviting user, the messaging client application 10, at block 2408, sends the event invitation message (e.g., a multimedia message, including the interactive media overlay) via the messaging system 100 from the inviting user (e.g., the message sender) to an invited user (e.g., the message receiver) as a direct message. The invited receiver, when viewing the multimedia message, is presented with a user interface such as that shown in FIG. 10, and presented with a view invite selector 1006 that is user-selectable to present an invitation to detail interface, such as that shown in FIG. 11. By selection of the icon join chat icon 1114, the invited user may send a request to join the group chat related to the event from an instance of the messaging client application 104 executing on the invited users' client device 102 to the application server 112, and specifically the group invitation system 120. The group invitation system, at block 2410, receives, from the invited user, the request to joining the group chat.

At block 2412, responsive to receipt of the request to join the group chat from the invited user, the group invitation system 120 joins the invited user to the group chat by updating the group chat data 504 to indicate a join of the invited user, based on user data 506. The group invitation system 120 may furthermore store, within the messaging system 100 and more specifically the database 124, a group chat message thread (e.g., as part of the messages 512) associated with the event group, this event group including at least the inviting and the invited users. At block 2414, the group invitation system 120 may then cause presentation of the group message thread, in association with an event identifier identifying the event. To this end, the group invitation system 120 interacts with the messaging server application, to present a group chat message feed within the appropriate user interfaces of the messaging client application 104 of each member of the event group. FIG. 12 illustrates an example of such a group chat message feed (including a group chat message thread) that may be presented by the messaging client application 104 to users.

Figure 25:
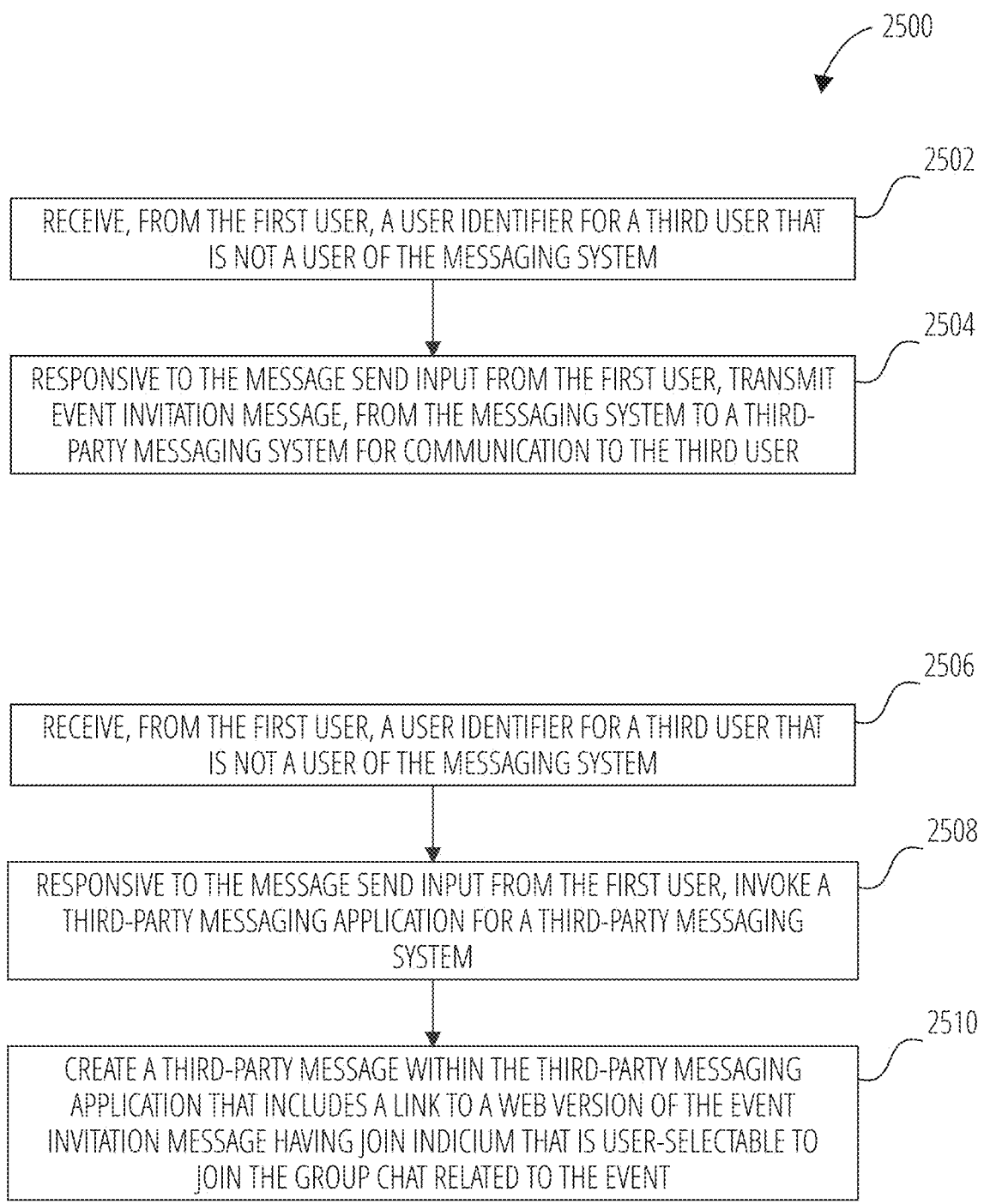
FIG. 25 illustrates a method 2500 in accordance with some examples.

FIG. 25 is a flowchart illustrating a further method 2500 of facilitating invitations to a group chat to persons that may not be current users of a particular messaging system 100. The method 2500 commences at block 2502 with the receipt, from an inviting user, of a user identifier (e.g., an email address or other addressing identifier) for a person that is not a user of the messaging system 100. At block 2504 and responsive to a message is sent input received from the inviting user, a messaging client application 104 of the sending user transmits an event invitation message, from the messaging system 100 (e.g., either directly from the messaging client application 104 or from the messaging server system 108) to a third-party messaging system for communication to the third user.

In a further embodiment, at block 2506, the messaging client application 104 receives, from the inviting user, a user identifier for a person that is not a user of the messaging system, and at block 2508, responsive to the message sent input from the inviting user, invokes a third-party messaging application (e.g., an email application), and, at block 2510, creates a message, within the third-party messaging application, that includes a link to a web version of an event invitation message, this web version of the event invitation message having a join indicium (e.g., URL) that is user-selectable to join a group chat related to the relevant event.

Figure 26:
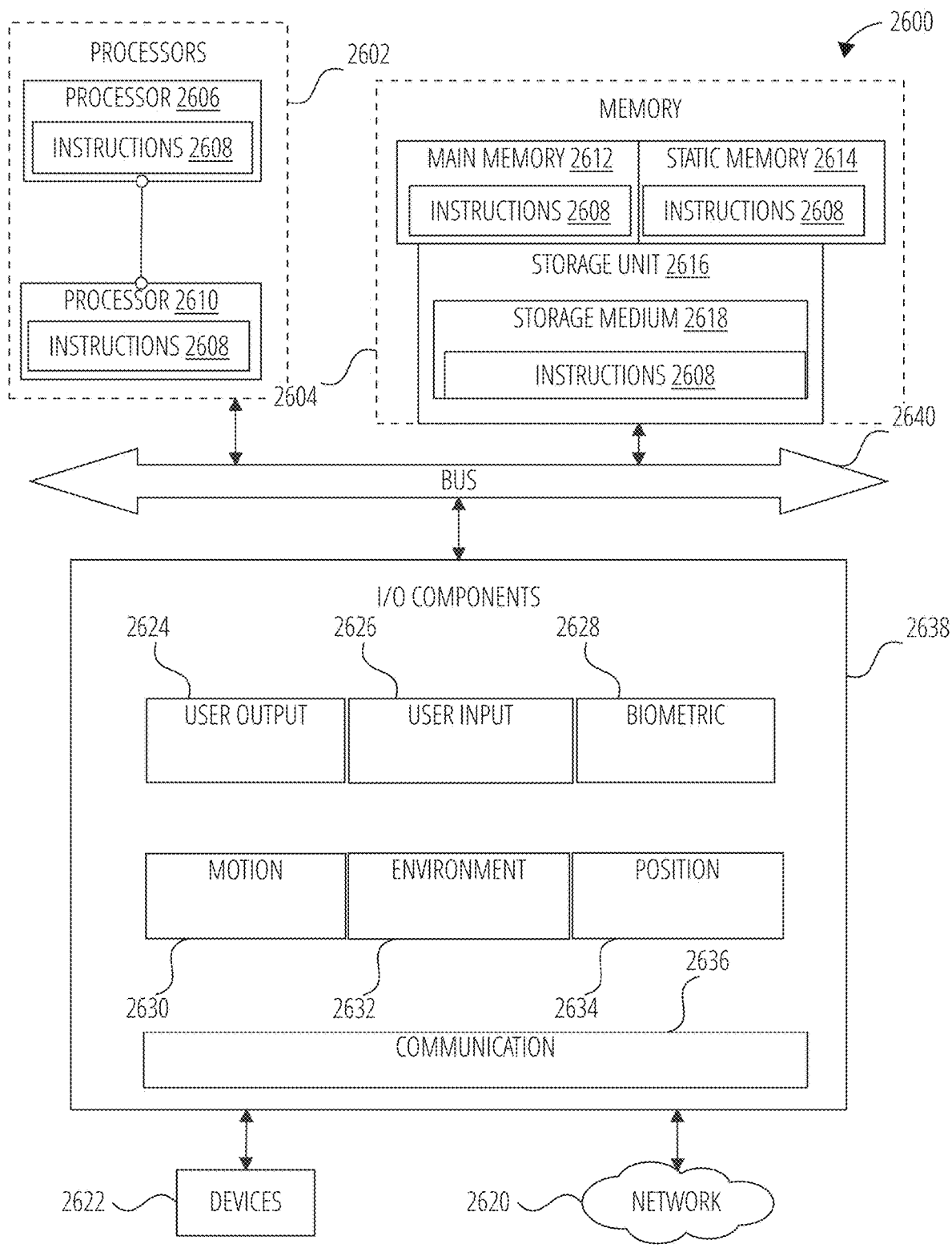
FIG. 26 is a diagrammatic representation of a machine in the form of a computer system within which a set of instructions may be executed for causing the machine to perform any one or more of the methodologies discussed herein, in accordance with some examples.

FIG. 26 is a diagrammatic representation of the machine 2600 within which instructions 2608 (e.g., software, a program, an application, an applet, an app, or other executable code) for causing the machine 2600 to perform any one or more of the methodologies discussed herein may be executed. For example, the instructions 2608 may cause the machine 2600 to execute any one or more of the methods described herein. The instructions 2608 transform the general, non-programmed machine 2600 into a particular machine 2600 programmed to carry out the described and illustrated functions in the manner described. The machine 2600 may operate as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2608, sequentially or otherwise, that specify actions to be taken by the machine 2600. Further, while only a single machine 2600 is illustrated, the term "machine" shall also be taken to include a collection of machines that individually or jointly execute the instructions 2608 to perform any one or more of the methodologies discussed herein.

The machine 2600 may include processors 2602, memory 2604, and I/O components 2638, which may be configured to communicate with each other via a bus 2640. In an example embodiment, the processors 2602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 2606 and a Processor 2610 that execute the instructions 2608. The term "Processor" is intended to include multi-core processors that may comprise two or more independent processors (sometimes referred to as "cores") that may execute instructions contemporaneously. Although FIG. 26 shows multiple processors 2602, the machine 2600 may include a single Processor with a single core, a single Processor with multiple cores (e.g., a multi-core Processor), multiple processors with a single core, multiple processors with multiples cores, or any combination thereof.

The memory 2604 includes a main memory 2612, a static memory 2614, and a storage unit 2616, both accessible to the processors 2602 via the bus 2640. The main memory 2604, the static memory 2614, and storage unit 2616 store the instructions 2608 embodying any one or more of the methodologies or functions described herein. The instructions 2608 may also reside, completely or partially, within the main memory 2612, within the static memory 2614, within computer-readable storage medium 2618 within the storage unit 2616, within at least one of the processors 2602 (e.g., within the Processor's cache memory), or any suitable combination thereof, during execution thereof by the machine 2600.

The I/O components 2638 may include a wide variety of components to receive input, provide output, produce output, transmit information, exchange information, capture measurements, and so on. The specific I/O components 2638 that are included in a particular machine will depend on the type of machine. For example, portable machines such as mobile phones may include a touch input device or other such input mechanisms, while a headless server machine will likely not include such a touch input device. It will be appreciated that the I/O components 2638 may include many other components that are not shown in FIG. 26. In various examples, the I/O components 2638 may include user output components 2624 and user input components 2626. The user output components 2624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 2638 may include biometric components 2628, motion components 2630, environmental components 2632, or position components 2634, among a wide array of other components. For example, the biometric components 2628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2630 include acceleration sensor components (e.g., accelerometer), gravitation sensor components, rotation sensor components (e.g., gyroscope). The environmental components 2632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2638 further include communication components 2636 operable to couple the machine 2600 to a network 2620 or devices 2622 via respective coupling or connections. For example, the communication components 2636 may include a network interface Component or another suitable device to interface with the network 2620. In further examples, the communication components 2636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2622 may be another machine or any of a wide variety of peripheral devices (e.g., a peripheral device coupled via a USB).

Moreover, the communication components 2636 may detect identifiers or include components operable to detect identifiers. For example, the communication components 2636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2636, such as location via Internet Protocol (IP) geolocation, location via Wi-Fi® signal triangulation, location via detecting an NFC beacon signal that may indicate a particular location, and so forth.

The various memories (e.g., main memory 2612, static memory 2614, and/or memory of the processors 2602) and/or storage unit 2616 may store one or more sets of instructions and data structures (e.g., software) embodying or used by any one or more of the methodologies or functions described herein. These instructions (e.g., the instructions 2608), when executed by processors 2602, cause various operations to implement the disclosed embodiments.

The instructions 2608 may be transmitted or received over the network 2620, using a transmission medium, via a network interface device (e.g., a network interface component included in the communication components 2636) and using any one of several well-known transfer protocols (e.g., hypertext transfer protocol (HTTP)). Similarly, the instructions 2608 may be transmitted or received using a transmission medium via a coupling (e.g., a peer-to-peer coupling) to the devices 2622.

Figure 27:
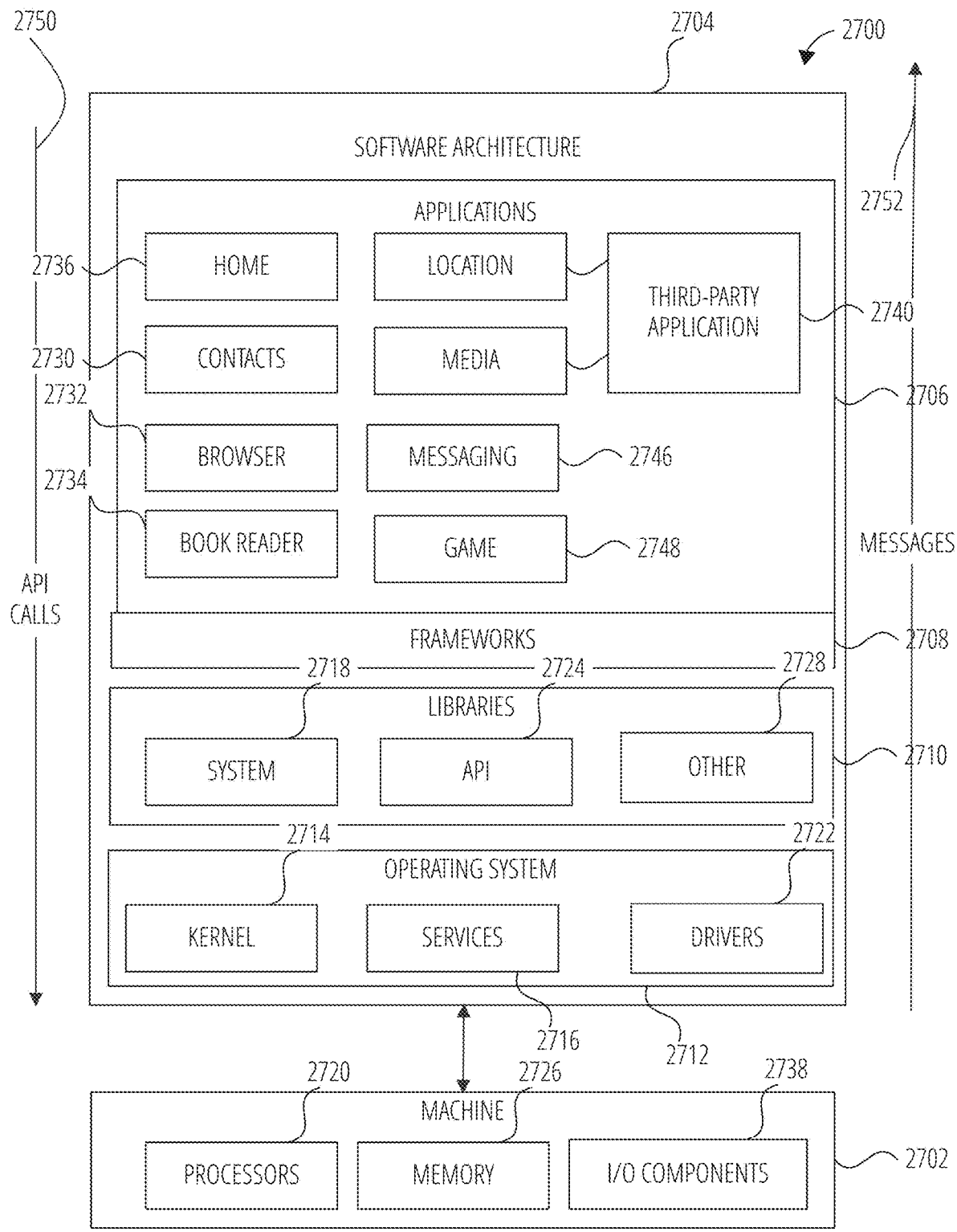
FIG. 27 is a block diagram showing a software architecture within which the present disclosure may be implemented, according to some examples.

FIG. 27 is a block diagram 2700 illustrating a software architecture 2704, which can be installed on any one or more of the devices described herein. The software architecture 2704 is supported by hardware such as a machine 2702 that includes processors 2720, memory 2726, and I/O components 2738. In this example, the software architecture 2704 can be conceptualized as a stack of layers, where each layer provides a particular functionality. The software architecture 2704 includes layers such as an operating system 2712, libraries 2710, frameworks 2708, and applications 2706. Operationally, the applications 2706 invoke API calls 2750 through the software stack and receive messages 2752 in response to the API calls 2750.

The operating system 2712, manages hardware resources and provides common services. The operating system 2712 includes, for example, a kernel 2714, services 2716, and drivers 2722. The kernel 2714 acts as an abstraction layer between the hardware and the other software layers. For example, the kernel 2714 provides memory management, processor management (e.g., scheduling), Component management, networking, and security settings, among other functionality. The services 2716 can provide other common services for the other software layers. The drivers 2722 are responsible for controlling or interfacing with the underlying hardware. For instance, the drivers 2722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2710 provide a common low-level infrastructure used by the applications 2706. The libraries 2710 can include system libraries 2718 (e.g., C standard library) that provide functions such as memory allocation functions, string manipulation functions, mathematic functions, and the like. In addition, the libraries 2710 can include API libraries 2724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2710 can also include a wide variety of other libraries 2728 to provide many other APIs to the applications 2706.

The frameworks 2708 provide a high-level common infrastructure that is used by the applications 2706. For example, the frameworks 2708 provide various graphical user interface (GUI) functions, high-level resource management, and high-level location services. The frameworks 2708 can provide a broad spectrum of other APIs that can be used by the applications 2706, some of which may be specific to a particular operating system or platform.

In an example embodiment, the applications 2706 may include a home application 2736, a contacts application 2730, a browser application 2732, a book reader application 2734, a location application 2742, a media application 2744, a messaging application 2746, a game application 2748, and a broad assortment of other applications such as a third-party application 2740. The applications 2706 are programs that execute functions defined in the programs. Various programming languages can be employed to create one or more of the applications 2706, structured in a variety of manners, such as object-oriented programming languages (e.g., Objective-C, Java, or C++) or procedural programming languages (e.g., C or assembly language). In a specific example, the third-party application 2740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2740 can invoke the API calls 2750 provided by the operating system 2712 to facilitate functionality described herein.

Examples

1. A method to manage an event invitation in a computer network environment, the method comprising:
presenting, using one or more processors, an event invitation creation indicium to a first user on a user interface of a computing device;
responsive to user selection of the event invitation creation indicium, presenting an event creation interface to receive event details relating to an event;
responsive to receipt of the event details, generating an event invitation message for communication, via a messaging system, by the first user to a second user of the messaging system, the event invitation message including a join indicium that is user-selectable to join a group chat related to the event;
responsive to a message send input from the first user, sending the event invitation message, via the messaging system, from the first user to the second user;
receiving, from the second user, a request to join the group chat related to the event; and
storing, within the messaging system, a group chat message thread associated with an event group including at least the first user and the second user.

2. The method of any one or more of the preceding examples, including presenting the group chat message thread in association with an event identifier identifying the event.

3. The method of any one or more of the preceding examples, wherein the event invitation message includes a response indicium that is user-selectable to provide an attendance response to the event invitation message.

4. The method of any one or more of the preceding examples, comprising:
receiving, from the first user, a user identifier for a third user that is not a user of the messaging system; and
responsive to the message send input from the first user, transmitting the event invitation message, from the messaging system to a third-party messaging system for communication to the third user.

5. The method of example 1, comprising:
receiving, from the first user, a user identifier for a third user that is not a user of the messaging system;
responsive to the message send input from the first user, invoking a third-party messaging application for a third-party messaging system;
creating a third-party message within the third-party messaging application that includes data pertaining to the event.

6. The method of any one or more of the preceding examples, wherein the data pertaining to the event includes a link to a web version of the event invitation message.

7. The method of any one or more of the preceding examples, wherein the web version of the event invitation message includes a join indicium that is user-selectable to join the group chat related to the event.

8. The method of any one or more of the preceding examples, wherein the web version of the event invitation message includes an update indicium that is user-selectable to receive updates regarding the event via the third-party messaging system.

9. A computing apparatus, the computing apparatus comprising:
a processor; and
a memory storing instructions that, when executed by the processor, configure the apparatus to:
cause presentation of an event invitation creation indicium to a first user on a user interface of a computing device;
responsive to user selection of the event invitation creation indicium, presenting an event creation interface to receive event details for an event;
responsive to receipt of the event details, generating an event invitation message for communication, via a messaging system, by the first user to a second user of the messaging system, the event invitation message including a join indicium that is user-selectable to join a group chat related to the event;
responsive to a message send input from the first user, sending the event invitation message, via the messaging system, from the first user to the second user;
receive, from the second user, a request to join the group chat related to the event; and
store, within the messaging system, a group chat message thread associated with an event group including at least the first user and the second user.

10. The computing apparatus of any one or more of the preceding examples, including presenting the group chat message thread in association with an event identifier identifying the event.

11. The computing apparatus of any one or more of the preceding examples, wherein the event invitation message includes a response indicium that is user-selectable to provide an attendance response to the event invitation message.

12. The computing apparatus of any one or more of the preceding examples, comprising:
receive, from the first user, a user identifier for a third user that is not a user of the messaging system; and
responsive to the message send input from the first user, transmitting the event invitation message, from the messaging system to a third-party messaging system for communication to the third user.

13. The computing apparatus of any one or more of the preceding examples, comprising:
receive, from the first user, a user identifier for a third user that is not a user of the messaging system;
responsive to the message send input from the first user, invoking a third-party messaging application for a third-party messaging system;
create a third-party message within the third-party messaging application that includes data pertaining to the event.

14. The computing apparatus of any one or more of the preceding examples, wherein the data pertaining to the event includes a link to a web version of the event invitation message.

15. The computing apparatus of any one or more of the preceding examples, wherein the web version of the event invitation message includes a join indicium that is user-selectable to join the group chat related to the event.

16. The computing apparatus of any one or more of the preceding examples, wherein the web version of the event invitation message includes an update indicium that is user-selectable to receive updates regard the event via the third-party messaging system.

17. A non-transitory computer-readable storage medium, the computer-readable storage medium including instructions that when executed by a computer, cause the computer to:

present, using one or more processors, an event invitation creation indicium to a first user on a user interface of a computing device;

responsive to user selection of the event invitation creation indicium, presenting an event creation interface to receive event details of an event;

responsive to receipt of the event details, generating an event invitation message for communication, via a messaging system, by the first user to a second user of the messaging system, the event invitation message including a join indicium that is user-selectable to join a group chat related to the event;

responsive to a message send input from the first user, sending the event invitation message, via the messaging system, from the first user to the second user;

receive, from the second user, a request to join the group chat related to the event; and store, within the messaging system, a group chat message thread associated with an event group including at least the first user and the second user.

18. The computer-readable storage medium of any one or more of the preceding examples, including presenting the group chat message thread in association with an event identifier identifying the event.

19. The computer-readable storage medium of any one or more of the preceding examples, wherein the event invitation message includes a response indicium that is user-selectable to provide an attendance response to the event invitation message.

20. The computer-readable storage medium of v, comprising:

receive, from the first user, a user identifier for a third user that is not a user of the messaging system; and responsive to the message send input from the first user, transmitting the event invitation message, from the messaging system to a third-party messaging system for communication to the third user.

21. The computer-readable storage medium of any one or more of the preceding examples, comprising:

receive, from the first user, a user identifier for a third user that is not a user of the messaging system;

responsive to the message send input from the first user, invoking a third-party messaging application for a third-party messaging system;

create a third-party message within the third-party messaging application that includes data pertaining to the event.

22. The computer-readable storage medium of any one or more of the preceding examples, wherein the data pertaining to the event includes a link to a web version of the event invitation message.

23. The computer-readable storage medium of any one or more of the preceding examples, wherein the web version of the event invitation message includes a join indicium that is user-selectable to join the group chat related to the event.

24. The computer-readable storage medium of any one or more of the preceding examples, wherein the web version of the event invitation message includes an update indicium that is user-selectable to receive updates regard the event via the third-party messaging system.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method to facilitate off-platform messaging by a messaging system, the method comprising:
   causing presentation, using one or more processors, of a message creation indicium on a user interface of a first computing device of a first user;
   responsive to user selection of the message creation indicium, invoking a communication mechanism selection interface, presenting a plurality of third-party communication mechanisms;
   responsive to user selection of at least one of the plurality of third-party communication mechanisms, creating a message including a network location identifier identifying a network resource containing information relating to an event;
   causing the message to be communicated to a second computing device of a second user via the at least one of the plurality of third-party communication mechanisms;
   receiving a request, including the network location identifier, from the second computing device of the second user to access the network resource;
   responsive to the request from the second computing device to access the network resource, causing presentation of an event invitation interface, the event invitation interface including a first user-selectable indicium to register with the messaging system and to join the second user to a group chat pertaining to the event and hosted by the messaging system; and
   responsive to selection of the first user selectable indicium, generating a network resource identifier that includes embedded information to join the second user to the group chat, the embedded information including an identifier of the event, an identifier of the first user, and an identifier of the second user.

2. The method of claim 1, wherein the communication mechanism selection interface includes an additional user interface element that is user-selectable to cause presentation of a third-party communication platform interface to receive third-party communication platform recipient data for the second user, to enable the messaging system to provide updates pertaining to the event to the second user via the third-party communication platform.

3. The method of claim 2, wherein the third-party communication platform is an SMS platform, and the recipient data for the second user comprises a mobile telephone number.

4. The method of claim 1, wherein the first user-selectable indicium is user-selectable to generate a registration request from the second computing device to cause presentation of a registration interface, the method comprising, responsive to receiving the registration request from the second computing device, causing presentation of the registration interface to receive registration information from the second user.

5. The method of claim 1, wherein the first user-selectable indicium is user-selectable to download a platform-based messaging client application associated with the messaging system to the second computing device.

6. The method of claim 5, wherein the first user-selectable indicium is user-selectable to issue a request to the messaging system to download the platform-based messaging client application, the request to download the platform-based messaging application including the network resource identifier and the embedded information.

7. The method of claim 1, wherein the event invitation interface includes a second user-selectable indicium, distinct from the first user-selectable indicium, the first user-selectable indicium being user-selectable to generate a request for a user registration interface to register a user as a user of a customized messaging application associated with the messaging system and the second user-selectable indicium being user-selectable to generate a request for a third-party communication platform interface to register a user to receive updates pertaining to the event via the third-party communication platform.

8. The method of claim 1, wherein the mechanism selection interface includes a first user element that is selectable to communicate event information via an SMS platform and a second user element that is selectable to communicate the event information via a social media platform.

9. The method of claim 1, wherein the event invitation interface includes an invitation response indicium that is user selectable by the second user to provide a response to an invitation to attend the event.

10. A computing apparatus, the computing apparatus comprising:
    a processor; and
    a memory storing instructions that, when executed by the processor, configure the apparatus to:
    cause presentation, using one or more processors, of a message creation indicium on a user interface of a first computing device of a first user;
    responsive to user selection of the message creation indicium, invoking a communication mechanism selection interface, present a plurality of third-party communication mechanisms;
    responsive to user selection of at least one of the plurality of third-party communication mechanisms, create a message including a network location identifier identifying a network resource containing information relating to an event;
    cause the message to be communicated to a second computing device of a second user via the at least one of the plurality of third-party communication mechanisms;
    receive a request, including the network location identifier, from the second computing device of the second user to access the network resource;
    responsive to the request from the second computing device to access the network resource, cause presentation of an event invitation interface, the event invitation interface including a first user-selectable indicium to register with a messaging system and to join the second user to a group chat pertaining to the event and hosted by the messaging system; and
    responsive to selection of the first user selectable indicium, generate a network resource identifier that includes embedded information to join the second user to the group chat, the embedded information including an identifier of the event, an identifier of the first user, and an identifier of the second user.

11. The computing apparatus of claim 10, wherein the communication mechanism selection interface includes an additional user interface element that is user-selectable to cause presentation of a third-party communication platform interface to receive third-party communication platform recipient data for the second user, to enable the messaging system to provide updates pertaining to the event to the second user via the third-party communication platform.

12. The computing apparatus of claim 11, wherein the third-party communication platform is an SMS platform, and the recipient data for the second user comprises a mobile telephone number.

13. The computing apparatus of claim 10, wherein the first user-selectable indicium is user-selectable to generate a registration request from the second computing device to cause presentation of a registration interface, the instructions, when executed by the processor, configure the apparatus to, responsive to receiving the registration request from the second computing device, cause presentation of the registration interface to receive registration information from the second user.

14. The computing apparatus of claim 10, wherein the first user-selectable indicium is user-selectable to download a platform-based messaging client application associated with the messaging system to the second computing device.

15. The computing apparatus of claim 14, wherein the first user-selectable indicium is user-selectable to issue a request to the messaging system to download the platform-based messaging client application, the request to download the platform-based messaging application including the network resource identifier and the embedded information.

16. The computing apparatus of claim 10, wherein the event invitation interface includes a second user-selectable indicium, distinct from the first user-selectable indicium, the first user-selectable indicium being user-selectable to generate a request for a user registration interface to register a user as a user of a customized messaging application associated with the messaging system and the second user-selectable indicium being user-selectable to generate a request for a third-party communication platform interface to register a user to receive updates pertaining to the event via the third-party communication platform.

17. The computing apparatus of claim 10, wherein the request to access the network resource further includes an identifier for the first user.

18. The computing apparatus of claim 10, wherein the event invitation interface includes an invitation response indicium that is user selectable by the second user to provide a response to an invitation to attend the event.

19. A non-transitory computer-readable storage medium, the computer-readable storage medium including instructions that when executed by a computer, cause the computer to:

cause presentation, using one or more processors, of a message creation indicium on a user interface of a first computing device of a first user;

responsive to user selection of the message creation indicium, invoking a communication mechanism selection interface, present a plurality of third-party communication mechanisms;

responsive to user selection of at least one of the plurality of third-party communication mechanisms, create a message including a network location identifier identifying a network resource containing information relating to an event;

cause the message to be communicated to a second computing device of a second user via the at least one of the plurality of third-party communication mechanisms;

receive a request, including the network location identifier, from the second computing device of the second user to access the network resource;

responsive to the request from the second computing device to access the network resource, cause presentation of an event invitation interface, the event invitation interface including a first user-selectable indicium to register with messaging system and to join the second user to a group chat pertaining to the event and hosted by the messaging system; and responsive to selection of the first user selectable indicium, generate a network resource identifier that includes embedded information to join the second user to the group chat, the embedded information including an identifier of the event, an identifier of the first user, and an identifier of the second user.

20. The non-transitory computer-readable storage medium of claim 19, wherein the computer-readable storage medium includes instructions that when executed by a computer, cause the computer to:

cause a messaging client application to be downloaded and installed on the second client device of the second user, the messaging client application enabling communication between users of the messaging system; and cause the second user to automatically join the group chat based on the embedded information after the messaging client application is downloaded and installed on the second client device.

* * * * *

UNITED STATES PATENT AND TRADEMARK OFFICE
CERTIFICATE OF CORRECTION

| | | |
|---|---|---|
| PATENT NO. | : 11,411,900 B2 | |
| APPLICATION NO. | : 16/835080 | |
| DATED | : August 9, 2022 | |
| INVENTOR(S) | : Boyd et al. | |

It is certified that error appears in the above-identified patent and that said Letters Patent is hereby corrected as shown below:

In the Claims

In Column 32, Line 23, in Claim 19, after "with", insert --a--

Signed and Sealed this
Twenty-third Day of May, 2023

*Katherine Kelly Vidal*

Katherine Kelly Vidal
*Director of the United States Patent and Trademark Office*